United States Patent
Mulcahy et al.

(10) Patent No.: US 11,718,790 B2
(45) Date of Patent: Aug. 8, 2023

(54) METHOD FOR THE PREPARATION OF A LIQUID CRYSTAL POLYMER FILM

(71) Applicant: Merck Patent GmbH, Darmstadt (DE)

(72) Inventors: Stephen Mulcahy, Southampton (GB); Eduardo Beltran Gracia, Southampton (GB); Owain Parri, Ringwood (GB); Vicki Poole, Southampton (GB); James Allen, Southampton (GB); Kevin Adlem, Bournemouth (GB); Hassan Arasi, Romsey (GB)

(73) Assignee: Merck Patent GmbH, Darmstadt (DE)

( * ) Notice: Subject to any disclaimer, the term of this patent is extended or adjusted under 35 U.S.C. 154(b) by 11 days.

(21) Appl. No.: 17/424,563

(22) PCT Filed: Jan. 20, 2020

(86) PCT No.: PCT/EP2020/051229
§ 371 (c)(1),
(2) Date: Jul. 21, 2021

(87) PCT Pub. No.: WO2020/152079
PCT Pub. Date: Jul. 30, 2020

(65) Prior Publication Data
US 2022/0119712 A1   Apr. 21, 2022

(30) Foreign Application Priority Data

Jan. 22, 2019 (EP) .................... 19153032

(51) Int. Cl.
| | |
|---|---|
| G02F 1/1333 | (2006.01) |
| C09K 19/38 | (2006.01) |
| C08F 222/10 | (2006.01) |
| G02F 1/1337 | (2006.01) |
| C09K 19/56 | (2006.01) |
| C09K 19/04 | (2006.01) |

(52) U.S. Cl.
CPC .... *C09K 19/3857* (2013.01); *C08F 222/1025* (2020.02); *C09K 19/56* (2013.01); *G02F 1/133726* (2021.01); *G02F 1/133738* (2021.01); *G02F 1/133788* (2013.01); *C08F 2800/20* (2013.01); *C09K 2019/0448* (2013.01)

(58) Field of Classification Search
CPC ................ C09K 19/3857; C09K 19/56; C09K 2019/0448; G02F 1/1333; G02F 1/133726; G02F 1/133738; G02F 1/133788
See application file for complete search history.

(56) References Cited

U.S. PATENT DOCUMENTS

| | | | |
|---|---|---|---|
| 10,465,115 B2* | 11/2019 | Adlem | ................. C07F 7/1876 |
| 10,626,330 B2 | 4/2020 | Adlem et al. | |
| 2019/0002763 A1 | 1/2019 | Adlem et al. | |
| 2019/0359889 A1 | 11/2019 | Mulcahy et al. | |
| 2022/0119712 A1* | 4/2022 | Mulcahy | ........... C08F 222/1025 |

FOREIGN PATENT DOCUMENTS

| | | |
|---|---|---|
| WO | 2017/102051 A1 | 6/2017 |
| WO | 2018/050608 A1 | 3/2018 |

OTHER PUBLICATIONS

Clark et al., "Photo-Reversible Liquid Crystal Alignment using Azobenzene-Based Self-Assembled Monolayers: Comparison of the Bare Monolayer and Liquid Crystal Reorientation Dynamics", 2010, Langmuir 26(22), pp. 17482-17488. (Year: 2010).*
International Search Report dated Apr. 15, 2020 issued in corresponding PCT/EP2020/051229 application (3 pages).

* cited by examiner

*Primary Examiner* — Geraldina Visconti
(74) *Attorney, Agent, or Firm* — Millen White Zelano and Branigan, PC; Csaba Henter

(57) ABSTRACT

The present invention relates to a method for the preparation of a homogeneous aligned liquid crystal polymer film, a polymer film obtainable from the corresponding method of production, and to the use of such polymer film for optical components and electro-optical decorative, as well as to components and devices comprising such polymer film.

16 Claims, No Drawings

METHOD FOR THE PREPARATION OF A LIQUID CRYSTAL POLYMER FILM

FIELD OF INVENTION

The present invention relates to a method for the preparation of a homogeneous aligned liquid crystal polymer film, a polymer film obtainable from the corresponding method of production, and to the use of such polymer film for optical components and electro-optical decorative, as well as to components and devices comprising such polymer film.

BACKGROUND AND PRIOR ART

Polymerizable liquid crystal materials or reactive mesogens (RM) are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular or perpendicular to the layer) or tilted.

Such optical films are described, for example, in EP 0 940 707 B1, EP 0 888 565 B1 and GB 2 329 393 B1.

Current RM coatings require an alignment layer, either rubbed polyimide (PI) or photoalignment layers. Without this alignment layer, there is no preferential order for the RM monomers to orient themselves. This leads to random alignment of the RM monomers and upon curing, random alignment of the polymer.

The standard techniques for giving homogeneous alignment of reactive mesogen molecules have downsides associated with them. The mechanical rubbing process for rubbed PI alignment can introduce some electrostatic charge and debris on the RM coatings, which can have a detrimental effect on the alignment.

Photoalignment processes have been invented recently which are a non-contact approach, however this adds another coating step into the production process which are undesirable from a cost perspective. For example, N. A. Clark et al., Langmuir 2010, 26(22), 17482-17488 have shown that it is possible to self-assemble a compound of the following structure

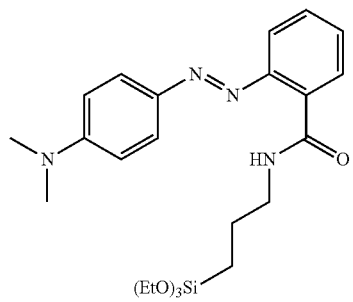

onto a substrate to give a monolayer that is able to be photoaligned to induce homogeneous alignment of a liquid crystal.

In Situ self-alignment has also been shown to be possible for liquid crystal systems, like it is disclosed in EP 3 390 570 A1, however never for reactive mesogen films.

For non-reactive liquid crystals, an additive containing photoalignment groups and photopolymerizable groups are used. In this process, the LC cell is irradiated with polarized UV light while in the isotropic phase. Then when cooled into the nematic phase, the LC adopts the alignment given by the, now reacted, self-alignment additive. This is difficult for RM films as most of the components in the formulation are photopolymerizable like the self-aligned additive. If the RM film is irradiated with UV light, the film will simply polymerize in the random alignment it has when coated so self-alignment additives which work for LC cannot work in RM films.

Therefore, there is still the need for new and preferably improved, method for the preparation of a homogeneous aligned liquid crystal polymer films or polymer films as such, which do not exhibit the drawbacks of prior art methods or films or if so, do only exhibit them to a less extent.

Advantageously, such method, should preferably be applicable for the preparation of uniform aligned polymer films that should be produced by compatible, cost-efficient and commonly known methods for the mass production, and the resulting polymer films should exhibit, preferably at the same time, a favourable adhesion to a substrate, high transparency to VIS-light, a lower dark state transmittance, a favourable high temperature stability or durability, and in addition, a uniform alignment.

Other aims of the present invention are immediately evident to the person skilled in the art from the following detailed description.

Surprisingly, the inventors of the present invention have found that one or more, preferably all of the above requirements aims can be achieved, preferably at the same time, by a method for the preparation of a homogeneous aligned liquid crystal polymer films according to claim 1.

SUMMARY OF THE INVENTION

Thus, the invention relates to a method for manufacturing a homogeneous aligned polymer film comprising at least the steps of:

providing a polymerizable liquid crystal mixture, comprising one or more polymerizable liquid crystal molecules, and one or more self assembling photoalignment agents, on a substrate;

irradiating the liquid crystal mixture with linearly polarised light causing photoalignment of the polymerizable liquid crystal mixture;

optionally curing the polymerizable liquid crystal compounds by irradiation with ultraviolet light.

The invention further relates to a polymer film obtainable, preferably obtained, from the method, as described above and below.

The invention further relates to the use of a polymer film, as described above and below, in an optical component, to an optical component comprising a polymer film in accordance with the present invention and to the use of such optical component in an optical device.

Finally, the present invention relates to an optical device optical comprising a polymer film or an optical component in accordance with the present invention.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

A photoreactive group according to the present invention is a functional group of a molecule that causes a change of the geometry of the molecule either by bond rotation, skeletal rearrangement or atom- or group-transfer, or by dimerization, upon irradiation with light of a suitable wavelength that can be absorbed by the molecule.

A photoreactive mesogen according to the present invention is a mesogenic compound comprising one or more photoreactive groups.

Examples of photoreactive groups are —C=C— double bonds and azo groups (—N=N—).

Examples of molecular structures and sub-structures comprising such photoreactive groups are stilbene, (1,2-difluoro-2 phenyl vinyl)-benzene, cinnamate, 4-phenylbut-3-en-2-one, chalcone, coumarin, chromone, pentalenone and azobenzene.

The term "polymerisable liquid crystal mixture" means a material, which comprises of more than 90% by weight, preferably more than 95% by weight, more preferably more than 98% by weight of polymerisable liquid crystal molecule compounds, as described above and below.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

According to the present application, the term "linearly polarised light" means light, which is at least partially linearly polarized. Preferably, the aligning light is linearly polarized with a degree of polarization of more than 5:1. Wavelengths, intensity and energy of the linearly polarised light are chosen depending on the photosensitivity of the photoalignable material. Typically, the wavelengths are in the UV-A, UV-B and/or UV-C range or in the visible range. Preferably, the linearly polarised light comprises light of wavelengths less than 450 nm, more preferably less than 420 nm at the same time the linearly polarised light preferably comprises light of wavelengths longer than 280 nm, preferably more than 320 nm, more preferably over 350 nm.

The Irradiance ($E_e$) or radiation power is defined as the power of electromagnetic radiation ($d\theta$) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The term "planar structure" or "planar orientation" or "homogeneous alignment" refers to a film wherein the optical axis is substantially parallel to the film plane.

The term "negative (optical) dispersion" refers to a birefringent or liquid crystalline material or layer that displays reverse birefringence dispersion where the magnitude of the birefringence ($\Delta n$) increases with increasing wavelength ($\lambda$). I.e. $|\Delta n (450)|<|\Delta n (550)|$, or $\Delta n (450)/\Delta n (550)<1$, where $\Delta n (450)$ and $\Delta n (550)$ are the birefringence of the material measured at wavelengths of 450 nm and 550 nm respectively. In contrast, positive (optical) dispersion" means a material or layer having $|\Delta n (450)|>|\Delta n (550)|$ or $\Delta n (450)/\Delta n (550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [$R(\lambda)=\Delta n(\lambda)\cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550)<1$ or $|R(450)|<|R(550)|$, and a material or layer with positive or normal dispersion has $R(450)/R(550)>1$ or $|R(450)|>|R(550)|$.

In the present invention, unless stated otherwise "optical dispersion" means the retardation dispersion i.e. the ratio $R(450)/R(550)$.

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data, it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

The birefringence $\Delta n$ is defined as follows $$\Delta n = n_e - n_o$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. $\Delta n$ can then be calculated from the above equations.

Unless the context clearly indicates otherwise, as used herein plural forms of the terms herein are to be construed as including the singular form and vice versa.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

The term "organic group" denotes a carbon or hydrocarbon group.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having 3 or more atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one more non-adjacent $CH_2$ groups may each be replaced, independently of one another, by —C($R^z$)=C($R^z$)—, —C≡C—, —N($R^z$)—, —O—, —S—, —CO—, —CO—O—, —O—CO—, —O—CO—O— in such a way that O and/or S atoms are not linked directly to one another.

$R^z$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO— or —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Preferred amino groups are, for example, dimethylamino, methylamino, methylphenylamino and phenylamino.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are derived, for example, from the parent structures benzene, biphenyl, terphenyl, [1,1':3',1"] terphenyl, naphthalene, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dihydrothieno [3,4-b]-1,4-dioxin, isobenzothiophene, dibenzothiophene, benzothiadiazothiophene, or combinations of these groups.

The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, and electron-withdrawing groups, such as fluorine, nitro or nitrile.

Preferred substituents, unless stated otherwise, also referred to as "L" above and below, are F, Cl, Br, I, —CN, —$NO_2$, —NCO, —NCS, —OCN, —SCN, —C(=O)N($R^z$)$_2$, —C(=O)$Y^1$, —C(=O)$R^z$, —N($R^z$)$_2$, in which $R^z$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, preferably 2 to 12, in which one or more H atoms may optionally be replaced by F or Cl.

"Substituted silyl or aryl" preferably means substituted by halogen, —CN, $R^{y1}$, —$OR^{y1}$, —CO—$R^{y1}$, —CO—O—$R^{y1}$, —O—CO—$R^{y1}$ or —O—CO—O—$R^{y1}$, in which $R^{y1}$ has the meaning indicated above.

Particularly preferred substituents L are, for example, F, Cl, CN, $CH_3$, $C_2H_5$, —CH($CH_3$)$_2$, $OCH_3$, $OC_2H_5$, $CF_3$, $OCF_3$, $OCHF_2$, $OC_2F_5$, furthermore phenyl.

Above and below "halogen" denotes F, Cl, Br or I.

Above and below, the terms "alkyl", "aryl", "heteroaryl", etc., also encompass polyvalent groups, for example alkylene, arylene, heteroarylene, etc.

In the formula shown above and below, a substituted phenylene ring

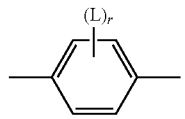

is preferably

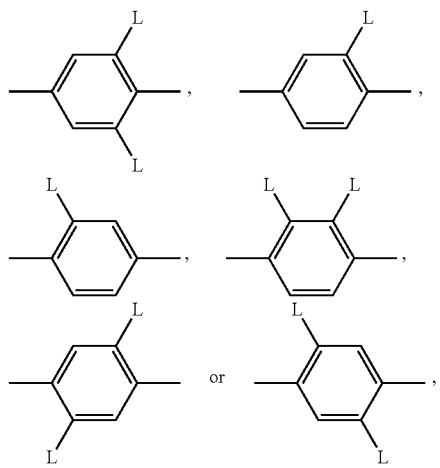

in which L has, on each occurrence identically or differently, one of the meanings given above and below, and is preferably F, Cl, CN, $NO_2$, $CH_3$, $C_2H_5$, C($CH_3$)$_3$, CH($CH_3$)$_2$, $CH_2CH(CH_3)C_2H_5$, $OCH_3$, $CO_2H_5$, $COCH_3$, $COC_2H_5$, $COOCH_3$, $COOC_2H_5$, $CF_3$, $OCF_3$, $OCHF_2$, $CO_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

"Polymerisable groups" (P) are preferably selected from groups containing a C=C double bond or C≡C triple bond, and groups which are suitable for polymerisation with ring opening, such as, for example, oxetane or epoxide groups.

Preferably, polymerisable groups (P) are selected from the group consisting of $CH_2$=$CW^1$—COO—, $CH_2$=$CW^1$—CO—,

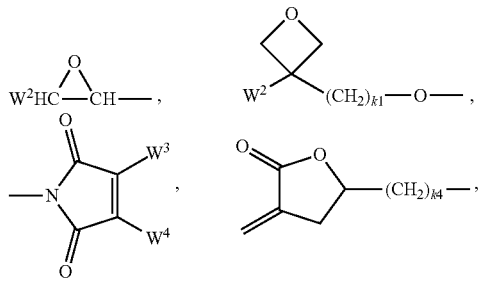

$CH_2$=$CW^2$—(O)$_{k3}$—, $CW^1$=CH—CO—(O)$_{k3}$—,
$CW^1$=CH—CO—NH—, $CH_2$=$CW^1$—CO—NH—,
$CH_3$—CH=CH—O—, ($CH_2$=CH)$_2$CH—OCO—,
($CH_2$=CH—$CH_2$)$_2$CH—OCO—, ($CH_2$=CH)$_2$CH—O—, $(CH_2=CH—CH_2)_2N—$, $(CH_2=CH—CH_2)_2N—CO—$, $CH_2=CW^1—CO—NH—$, $CH_2=CH—(COO)_{k1}$-Phe-$(O)_{k2}—$, $CH_2=CH—(CO)_{k1}$-Phe-$(O)_{k2}—$, Phe-$CH=CH—$, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $CO_2H_5$, $COCH_3$, $COC_2H_5$, $COOCH_3$, $COOC_2H_5$, $CF_3$, $OCF_3$, $OCHF_2$, $CO_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2=CH—COO—$, $CH_2=C(CH_3)—COO—$, $CH_2=CF—COO—$, $CH_2=CH—$, $CH_2=CH—O—$, $(CH_2=CH)_2CH—OCO—$, $(CH_2=CH)_2CH—O—$,

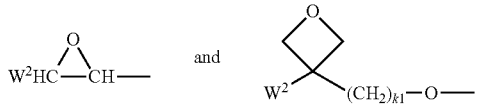

in which $W^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

| | |
|---|---|
| —X-alkyl-$CHP^x$—$CH_2$—$CH_2P^y$ | I*a |
| —X-alkyl-$C(CH_2P^x)(CH_2P^y)$—$CH_2P^z$ | I*b |
| —X-alkyl-$CHP^xCHP^y$—$CH_2P^z$ | I*c |
| —X-alkyl-$C(CH_2P^x)(CH_2P^y)$—$C_{aa}H_{2aa+1}$ | I*d |
| —X-alkyl-$CHP^x$—$CH_2P^y$ | I*e |
| —X-alkyl-$CHP^xP^y$ | I*f |
| —X-alkyl-$CP^xP^y$—$C_{aa}H_{2aa+1}$ | I*g |
| —X-alkyl-$C(CH_2P^y)(CH_2P^{yy})$—$CH_2OCH_2$—$C(CH_2P^x)(CH_2P^y)CH_2P^z$ | I*h |
| —X-alkyl-$CH((CH_2)_{aa}P^x)((CH_2)_{bb}P^y)$ | I*i |
| —X-alkyl-$CHP^xCHP^y$—$C_{aa}H_{2aa+1}$ | I*k | in which alkyl denotes a single bond or straight-chain or branched alkylene having 1 to 12 C atoms, in which one or more non-adjacent $CH_2$ groups may each be replaced, independently of one another, by $—C(R^x)=C(R^x)—$, $—C≡C—$, $—N(R^x)—$, $—O—$, $—S—$, $—CO—$, $—CO—O—$, $—O—CO—$, $—O—CO—O—$ in such a way that O and/or S atoms are not linked directly to one another, and in which, in addition, one or more H atoms may be replaced by F, Cl or CN, where $R^x$ has one the above-mentioned meaning, $aa$ and $bb$ each, independently of one another, denote 0, 1, 2, 3, 4, 5 or 6, X has one of the meanings indicated for X', and $P^v$ to $P^z$ each, independently of one another, have one of the meanings indicated above for P.

Preferred spacer groups Sp are selected from the formula Sp'—X'—, so that the radical "P-Sp-" conforms to the formula "P-Sp'—X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by $—O—$, $—S—$, $—NH—$, $—NR^{xx}—$, $—SiR^{xx}R^{yy}—$, $—CO—$, $—COO—$, $—OCO—$, $—OCO—O—$, $—S—CO—$, $—CO—S—$, $—NR^{xx}—CO—O—$, $—O—CO—NR^{0xx}—$, $—NR^{xx}—CO—NR^{yy}—$, $—CH=CH—$ or $—C≡C—$ in such a way that O and/or S atoms are not linked directly to one another, X' denotes $—O—$, $—S—$, $—CO—$, $—COO—$, $—OCO—$, $—O—COO—$, $—CO—NR^{xx}—$, $—NR^{xx}—COO—$, $—NR^{xx}—CO—NR^{yy}—$, $—OCH_2—$, $—CH_2O—$, $—SCH_2—$, $—CH_2S—$, $—CF_2O—$, $—OCF_2—$, $—CF_2S—$, $—SCF_2—$, $—CF_2CH_2—$, $—CH_2CF_2—$, $—CF_2CF_2—$, $—CH=N—$, $—N=CH—$, $—N=N—$, $—CH=CR^{xx}—$, $—CY^{xx}=CY^{xx}—$, $—C≡C—$, $—CH=CH—COO—$, $—OCO—CH=CH—$ or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably $—O—$, $—S—$ $—CO—$, $—COO—$, $—OCO—$, $—O—COO—$, $—CO—NR^{xx}—$, $—NR^{xx}—CO—$, $—NR^{xx}—CO—NR^{yy}—$ or a single bond.

Typical spacer groups Sp' are, for example, $—(CH_2)_{p1}—$, $—(CH_2CH_2O)_{q1}—CH_2CH_2—$, $—CH_2CH_2—S—CH_2CH_2—$, $—CH_2CH_2—NH—CH_2CH_2—$ or $—(SiR^{xx}R^{yy}—O)_{p1}—$, in which p1 is an integer from 1 to 12, q1 is an integer from 1 to 3, and $R^{xx}$ and $R^{yy}$ have the above-mentioned meanings.

Particularly preferred groups —X'—Sp'- are $—(CH_2)_{p1}—$, $—O—(CH_2)_{p1}—$, $—OCO—(CH_2)_{p1}—$, $—OCOO—(CH_2)_{p1}—$, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

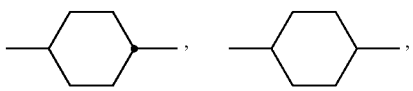

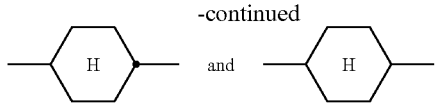

denote 1,4-cyclohexylene, preferably trans-1,4-cyclohexylene, and

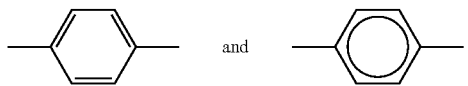

denote 1,4-phenylene.

For the present invention the groups —CO—O—, —COO—, —C(═O)O— or —CO$_2$-denote an ester group of formula

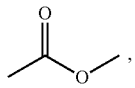

and the groups —O—CO—, —OCO—, —OC(═O)—, —O$_2$C— or —OOC— denote an ester group of formula

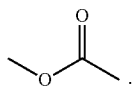

A "polymer network" is a network in which all polymer chains are interconnected to form a single macroscopic entity by many crosslinks.

The polymer network can occur in the following types:

A graft polymer molecule is a branched polymer molecule in which one or more the side chains are different, structurally or configurationally, from the main chain.

A star polymer molecule is a branched polymer molecule in which a single branch point gives rise to multiple linear chains or arms. If the arms are identical, the star polymer molecule is said to be regular. If adjacent arms are composed of different repeating subunits, the star polymer molecule is said to be variegated.

A comb polymer molecule consists of a main chain with two or more three-way branch points and linear side chains. If the arms are identical the comb polymer molecule is said to be regular.

A brush polymer molecule consists of a main chain with linear, unbranched side chains and where one or more of the branch points has four-way functionality or larger.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius and all temperature differences are quoted in differential degrees.

DETAILED DESCRIPTION

As already mentioned the present invention relates to a method for manufacturing of a homogeneous aligned polymer film comprising at least the steps of:
providing a polymerizable liquid crystal mixture, comprising one or more polymerizable liquid crystal molecules, and one or more self assembling photoalignment agents, on a substrate;
irradiating the liquid crystal mixture with linearly polarised light causing photoalignment of the polymerizable liquid crystal mixture;
optionally curing the polymerizable liquid crystal compounds by irradiation with ultraviolet light.

A self assembling photoalignment agent (SAPA) according to the present invention is preferably a compound comprising at least one polar lateral group and at least one photoreactive group. Considering the investigations for this invention it appears that the polar lateral group interacts with the substrate surface thus enabling the SAPA to phase separate from the LC mixture after filling of the LC cell. According to this opinion, the SAPA forms a layer on the substrate which can be photoaligned with linearly polarised UV light. The liquid crystal follows the orientation of the aligned SAPA to give uniform planar alignment across the whole display.

The photoalignment process according to the present invention causes the SAPA to undergo an isomerisation under irradiation with linearly polarised light of appropriate wavelength. The photoisomerisation is an angle-dependent process, resulting eventually in the photoselection of SAPA orientations that are preferentially perpendicular to the polarization of the actinic light and with orientational anisotropy capable of aligning LCs.

The wavelength region of the polarised light is preferably chosen so as to match the absorption spectrum of the SAPA.

Preferably one or more self assembling agents are selected from compounds of formula S,

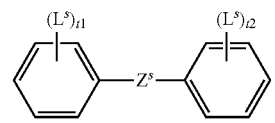

wherein
$L^s$ each, identically or differently, denote on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, $(Sp^s)_{r1}$-G, Y, or $(Sp^s)_{r1}$—P$^s$,
P$^s$ each, independently of one another, denote a polymerisable group,
Sp$^s$ on each occurrence, identically or differently, denote a spacer group,
Y denotes $(R^b)_2$N— or, R$^c$C(O)O—,
G denotes —OH or Si(OR$^a$)$_3$ $R^a$, $R^b$, $R^c$ each denote, identically or differently, H, straight chain or branched alkyl with 1 to 6 C atoms, r1 denotes 0 or 1, t1, t2 denotes each and independently, 1, 2, 3, 4 or 5, and $Z^s$ denotes a group selected from —N=N—, —CH=CH—, —CH=CH—COO—, —OCO—CH=CH—, —CO—CH=CH—, —CH=CH—CO—, wherein one or more H maybe replaced by halogen.

Preferred self assembling agents are selected from compounds of formula S that can be reactive, thus compounds of formula S wherein one or more of $L^s$ are selected from $(Sp^s)_{r1}$—$P^s$, or non-reactive, thus compounds thus compounds of formula S wherein none of $L^s$ are selected from $(Sp^s)_{r1}$—$P^s$.

If reactive self assembling agents are chosen, they are selected from compounds wherein the photoreaction takes place at another wavelengths than the polymerization.

Further preferred self assembling agents are selected from compounds of formula S1

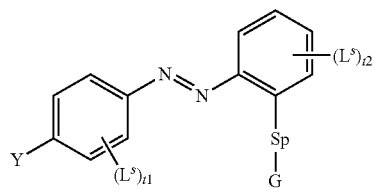

S1 wherein

Y denotes $(R^b)_2N$—, $R^cC(O)O$—, or a group $L^s$,

Sp denotes a spacer group,

G denotes —OH or $Si(OR^a)_3$ $R^a$, $R^b$, $R^c$ each denote, identically or differently, straight chain or branched alkyl with 1 to 6 C atoms, $L^s$ each, identically or differently, denote a group as defined for formula S t1, t2 denotes 0, 1, 2, 3 or 4, Preferred compounds of formula S1 are selected from the compounds of formula S1-1 or S1-2

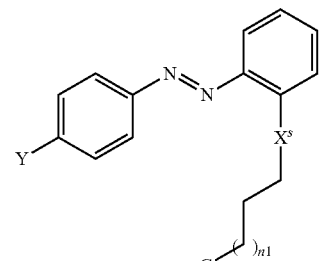

S1-1

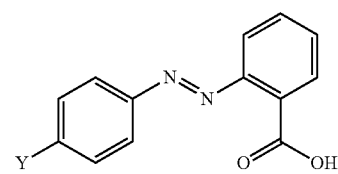

S1-2 wherein the parameters have the meaning defined above and $X^s$ denotes O, —C(O)O—, C(O)NH— or a single bond.

Particularly preferred compounds of formula S-1 are the following compounds S1-1 and S1-2,

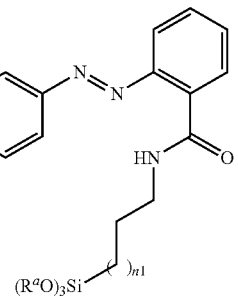

S1-1a

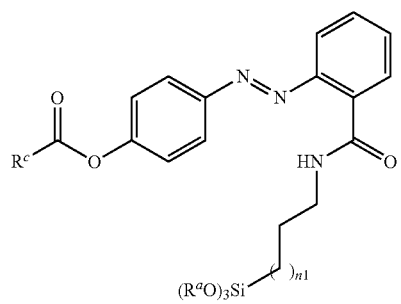

S1-1b

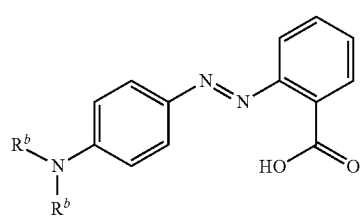

S1-1a

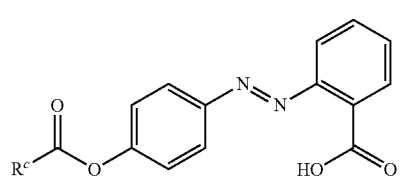

S1-1b wherein the parameters have the meaning given above and preferably $R^a$ denotes methyl or ethyl, $R^b$ and $R^c$ denote methyl and n1 denotes an integer from 0 to 10, preferably 1 to 4.

Preferably the proportion of SAPA preferably of compounds of formula S in the polymerizable liquid crystal in the LC medium is from 1 to 15%, very preferably from 3 to 12%, in particular 5 to 10%.

The compounds of the formula S and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Some of the compounds are also commercially available such as commonly known Methyl Red.

In a preferred embodiment, one or more polymerizable liquid crystals or polymerizable liquid crystal molecules are selected from compounds of formula P, $$P^a\text{-}(Sp^a)_{s1}\text{-}A^2\text{-}(Z^1\text{-}A^1)_{n2}\text{-}R^a \qquad P$$

wherein
P$^a$ each, independently of one another, denote a polymerisable group,
Sp$^a$ on each occurrence, identically or differently, denote a spacer group,
s1 denotes 0 or 1,
R$^a$ denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, or P$^a$—(Sp$^a$)$_{s1}$
A$^1$, A$^2$ each, independently of one another, denote a radical selected from the following groups:
  a) the group consisting of trans-1,4-cyclohexylene, 1,4-cyclohexenylene and 4,4'-bicyclohexylene, wherein, in addition, one or more non-adjacent CH$_2$ groups may be replaced by —O— and/or —S— and wherein, in addition, one or more H atoms may be replaced by F,
  b) the group consisting of 1,4-phenylene and 1,3-phenylene, wherein, in addition, one or two CH groups may be replaced by N and wherein, in addition, one or more H atoms may be replaced by L,
  c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
  d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from:

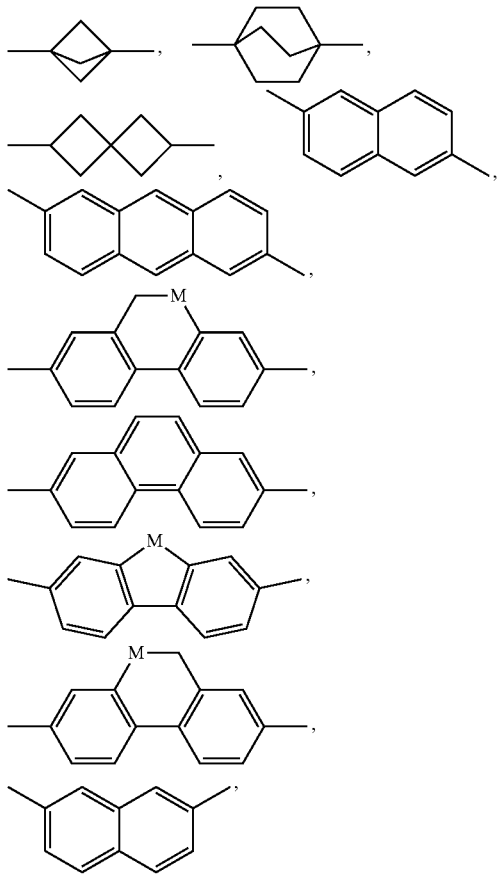

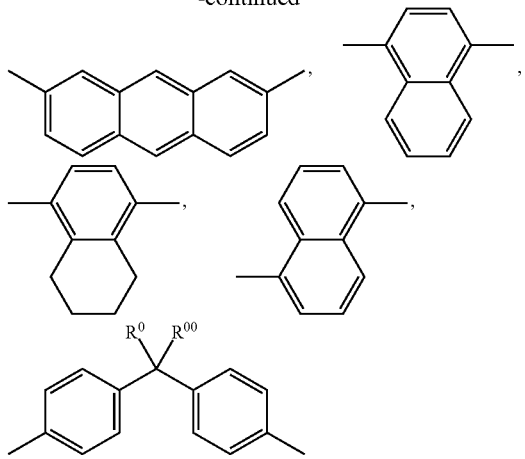

where, in addition, one or more H atoms in these radicals may be replaced by L, and/or one or more double bonds may be replaced by single bonds, and/or one or more CH groups may be replaced by N,
n2 denotes 0, 1, 2 or 3,
Z$^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond,
L is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl or heteroaryl with 1 to 12 C atoms, straight chain or branched alkyl, alkoxy, alkylcarbonyl, alkoxycarbonyl, alkylcarbonyloxy or alkoxycarbonyloxy with 1 to 12, C atoms, wherein one or more H atoms are optionally replaced by F or Cl,
R$^0$, R$^{00}$, R$^{000}$ each, independently of one another, denote H, F or straight-chain or branched alkyl having 1 to 12 C atoms, wherein, in addition, one or more H atoms may be replaced by F,
Y$^1$ and Y$^2$ independently of each other denote H, F, Cl or CN,
n is 1, 2, 3 or 4,
n1 is an integer from 1 to 10.
M denotes —O—, —S—, —CH$_2$—, —CHY$^1$— or —CY$^1$Y$^2$—, and
Y$^1$ and Y$^2$ each, independently of one another, have one of the meanings indicated above for R$^o$ or denote Cl or CN.
Preferred compounds formula P are selected from compounds that can be mono-, di- or multireactive.
Preferably, one or more polymerizable liquid crystal molecules are selected from one or more di- or multireactive mesogenic compounds are selected of formula DRM P$^1$-Sp$^1$-MG-Sp$^2$-P$^2$     DRM wherein
P$^1$ and P$^2$ independently of each other denote a polymerisable group, Sp$^1$ and Sp$^2$ independently of each other are a spacer group or a single bond, and MG is a rod-shaped mesogenic group, which is preferably selected of formula MG -(A$^{11}$-Z$^{11}$)$_n$-A$^{12}$-    MG wherein A$^{11}$ and A$^{12}$ denote, in case of multiple occurrence independently of one another, an aromatic or alicyclic group, which optionally contains one or more heteroatoms selected from N, O and S, and is optionally mono- or polysubstituted by L$^{11}$, L$^{11}$ is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, R$^{00}$ and R$^{000}$ each, independently of one another, denote H, F or straight-chain or branched alkyl having 1 to 12 C atoms, wherein, in addition, one or more H atoms may be replaced by F, Z$^{11}$ denotes, in case of multiple occurrence independently of one another, —O—, —S—, —CO—, —COO—, —OCO—, —S—CO—, —CO—S—, —O—COO—, —CO—NR$^{00}$, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, Y$^1$ and Y$^2$ independently of each other denote H, F, Cl or CN, n is 1, 2, 3 or 4, preferably 1 or 2, most preferably 2, n1 is an integer from 1 to 10, preferably 1, 2, 3 or 4.

Preferred groups A$^{11}$ and A$^{12}$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L$^{11}$ as defined above.

Particular preferred groups A$^{11}$ and A$^{12}$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Particular preferred groups Z$^{11}$ are in each occurrence independently from another preferably selected from —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, Very preferred one or more polymerizable liquid crystal molecules are selected from direactive mesogenic compounds of formula DRM are selected from the following formulae:

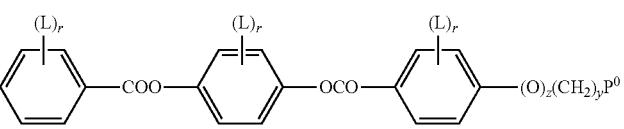

DRMa1

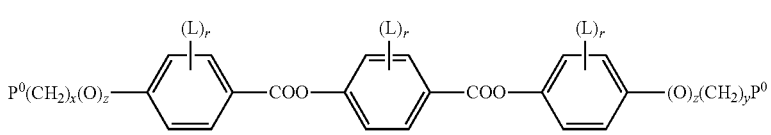

DRMa2

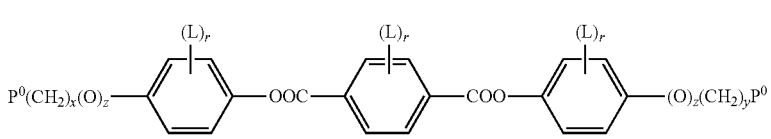

DRMa3

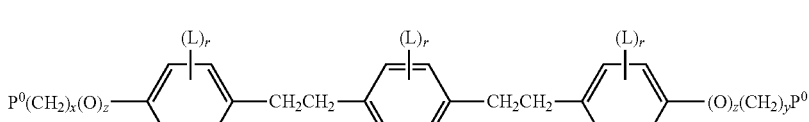

DRMa4

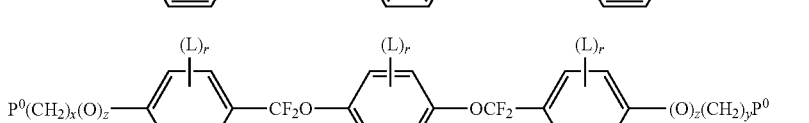

DRMa5

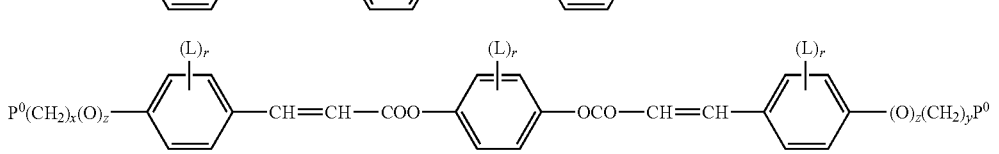

DRMa6

-continued

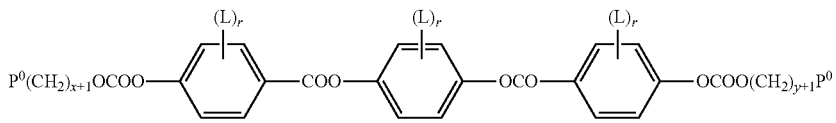
DRMa7

DRMb

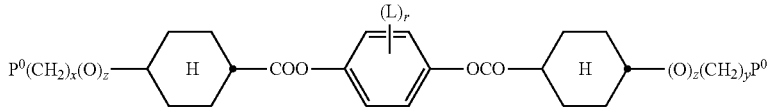
DRMc

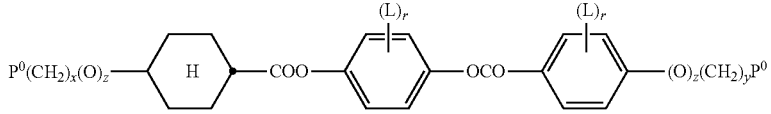
DRMd

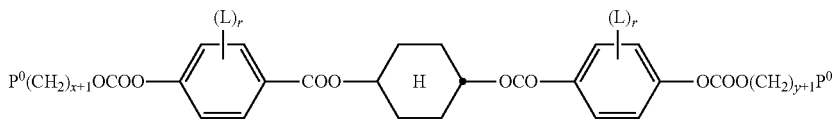
DRMe wherein $P^0$ is, in case of multiple occurrence independently of one another, a polymerisable group, preferably an acryl, methacryl, oxetane, epoxy, vinyl, heptadiene, vinyloxy, propenyl ether or styrene group, L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, z is each and independently, 0 or 1, with z being 0 if the adjacent x or y is 0.

Especially preferred are compounds of formula DRMa1, DRMa2 and DRMa3, in particular those of formula DRMa1.

Preferably, one or more polymerizable liquid crystal molecules are selected from one monoreactive mesogenic compounds, more preferably selected from compounds of formula MRM, $$P^1\text{-}Sp^1\text{-}MG\text{-}R \quad \quad \text{MRM}$$

wherein $P^1$, $Sp^1$ and MG have the meanings given in formula DRM,

R F, Cl, Br, I, —CN, —NO$_2$, —NCO, —NCS, —OCN, —SCN, —C(=O)NR$^x$R$^y$, —C(=O)X, —C(=O)OR$^x$, —C(=O)R$^y$, —NR$^x$R$^y$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and $R^x$ and $R^y$ are independently of each other H or alkyl with 1 to 12 C-atoms.

Preferred compounds of formula MRM are selected from the following formulae.

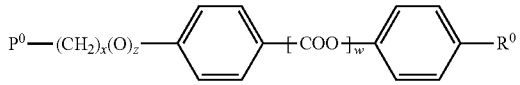
MRM1

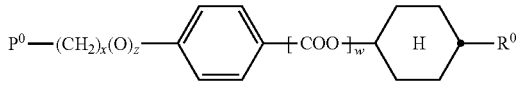
MRM2

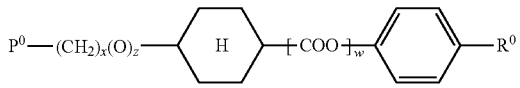
MRM3

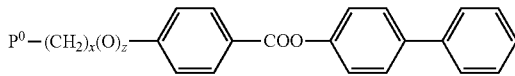
MRM4

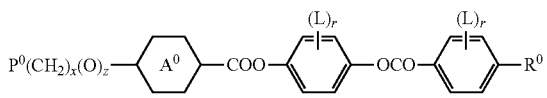
MRM5

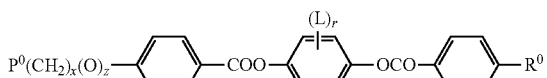
MRM6

-continued
MRM7
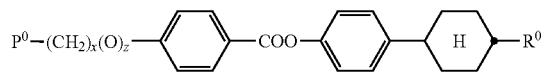
MRM8
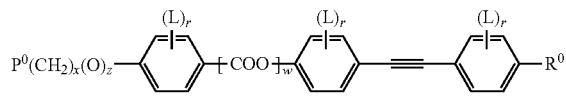
MRM9
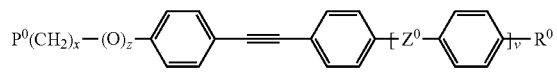
MRM10
MRM11
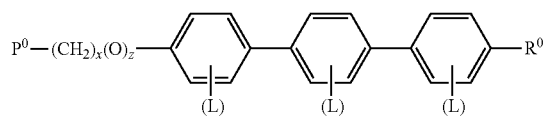
MRM12
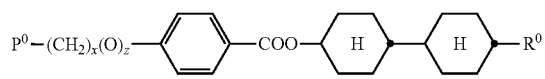
MRM13
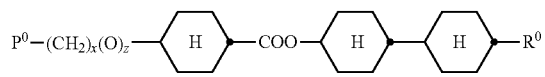
MRM14
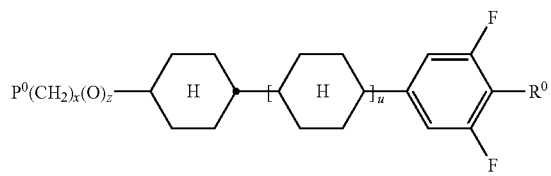
MRM15
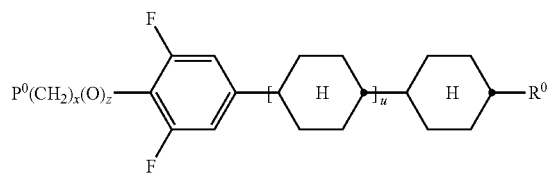
MRM16
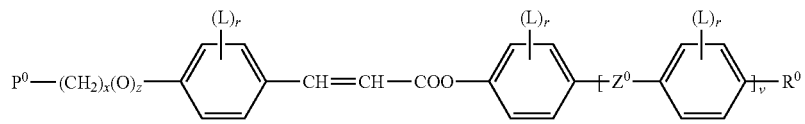
MRM17
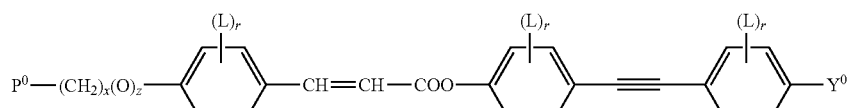
MRM18
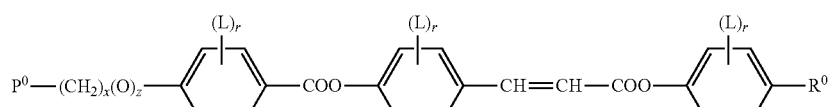
MRM19
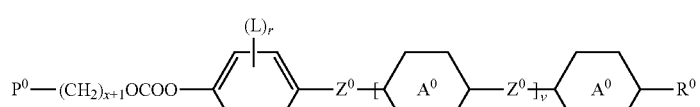
MRM20
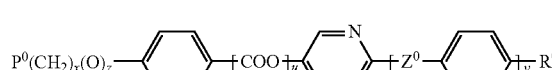
MRM21
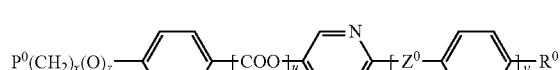
MRM22
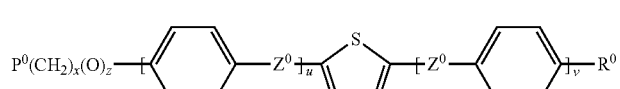

-continued

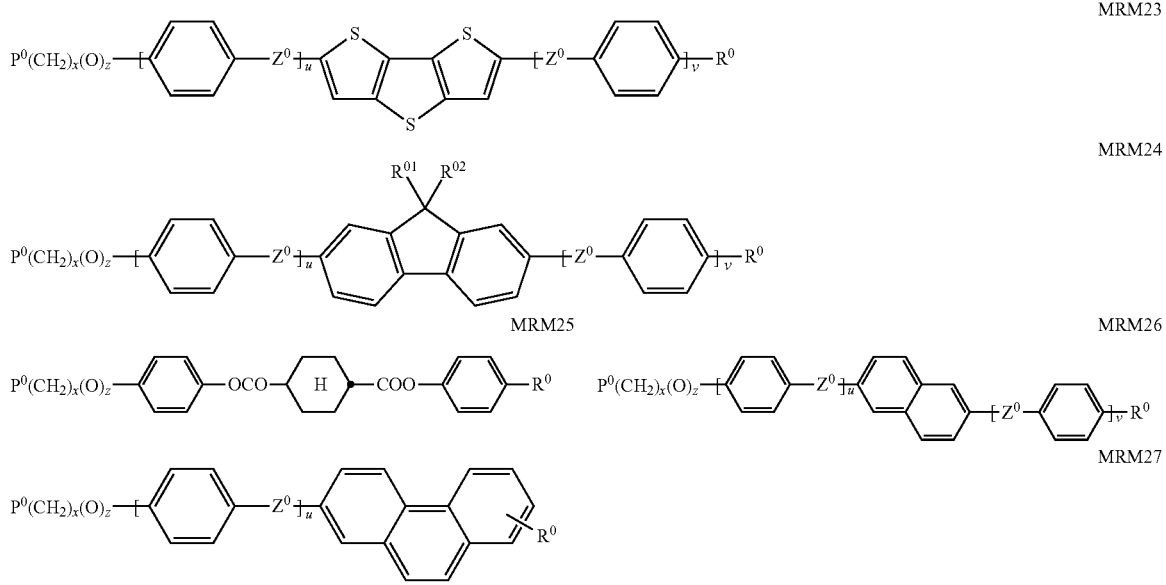

wherein P⁰, L, r, x, y and z are as defined in formula DRMa-1 to formula DRMe,

R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y°, Y° is F, Cl, CN, NO₂, OCH₃, OCN, SCN, SF₅, or mono- oligo- or polyfluorinated alkyl or alkoxy with 1 to 4 C atoms, Z⁰ is —COO—, —OCO—, —CH₂CH₂—, —CF₂O—, —OCF₂—, —CH=CH—, —OCO—CH=CH—, —CH=CH—COO—, or a single bond, A⁰ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, w is 0 or 1, and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, especially those of formula MRM1, MRM4, MRM6, and MRM7, and in particular those of formulae MRM1 and MRM7.

The compounds of the formulae P, DRM, MRM, and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The proportion of said mono-, di- or multireactive liquid-crystalline compounds in a polymerizable liquid crystal mixture as a whole, is preferably in the range from 30 to 99.9% by weight, more preferably in the range from 50 to 99.9% by weight and even more preferably in the range from 85 to 99.9% by weight.

In a preferred embodiment, the proportion of the di- or multireactive polymerisable mesogenic compounds in a polymerizable liquid crystal mixture as a whole, is preferably in the range from 5 to 99% by weight, more preferably in the range from 10 to 97% by weight and even more preferably in the range from 15 to 95% by weight.

In another preferred embodiment, the proportion of the monoreactive polymerisable mesogenic compounds in a polymerizable liquid crystal mixture as a whole, is, if present, preferably in the range from 5 to 80% by weight, more preferably in the range from 10 to 75% by weight and even more preferably in the range from 15 to 70% by weight.

In another preferred embodiment, the proportion of the multireactive polymerizable mesogenic compounds in a polymerizable liquid crystal mixture as a whole is, if present, preferably in the range from 1 to 30% by weight, more preferably in the range from 2 to 20% by weight and even more preferably in the range from 3 to 10% by weight.

In another preferred embodiment the polymerizable liquid crystal mixture does not contain polymerizable mesogenic compounds having more than two polymerisable groups.

In another preferred embodiment the polymerizable liquid crystal mixture does not contain polymerizable mesogenic compounds having less than two polymerisable groups.

In another preferred embodiment the polymerizable liquid crystal mixture is an achiral material, i.e. it does not contain any chiral polymerizable mesogenic compounds or other chiral compounds.

In a further preferred embodiment, the polymerizable liquid crystal mixture comprises at least one monoreactive mesogenic compound, preferably selected from formulae MRM-1, at least one direactive mesogenic compound, preferably selected from formula DRMa-1, and one or more compounds of formula S.

In a further preferred embodiment, the polymerizable liquid crystal mixture comprises at least one monoreactive mesogenic compound, preferably selected from formula MRM-7, at least one direactive mesogenic compound, preferably selected from formula DRMa-1, and one or more compounds of formula S.

In a further preferred embodiment, the polymerizable liquid crystal mixture comprises at least two monoreactive mesogenic compound, preferably selected from compounds of formulae MRM-1 and/or MRM-7, at least one direactive mesogenic compound, preferably selected from formula DRMa-1, and one or more compounds of formula S.

In a further preferred embodiment, the polymerizable liquid crystal mixture comprises at least two monoreactive mesogenic compounds, preferably selected from compounds of formulae MRM-1 and/or MRM-7, at least two direactive mesogenic compounds, preferably selected from compounds of formula DRMa-1, and one or more compounds of formula S.

In a further preferred embodiment, the polymerizable liquid crystal mixture comprises at least two direactive mesogenic compounds, preferably selected from compounds of formula DRMa-1, and one or more compounds of formula S.

In a further preferred embodiment, especially for negative optical dispersion applications, the polymerizable liquid crystal mixture as described above comprises additionally one or more compounds of formula ND,

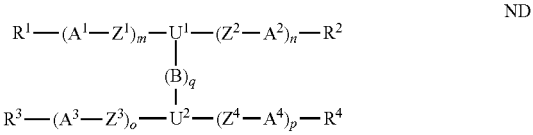

ND wherein
$U^{1,2}$ are independently of each other selected from

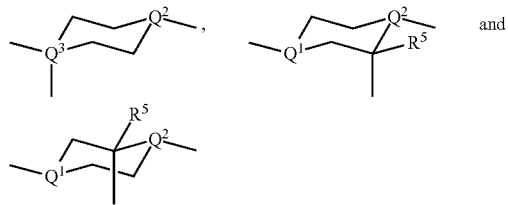
and including their mirror images, wherein the rings $U^1$ and $U^2$ are each bonded to the group $—(B)_q—$ via the axial bond, and one or two non-adjacent $CH_2$ groups in these rings are optionally replaced by O and/or S, and the rings $U^1$ and $U^2$ are optionally substituted by one or more groups L, $Q^{1,2}$ are independently of each other CH or SiH,
$Q^3$ is C or Si,
B is in each occurrence independently of one another $—C{\equiv}C—$, $—CY^1{=}CY^2—$ or an optionally substituted aromatic or heteroaromatic group,
$Y^{1,2}$ are independently of each other H, F, Cl, CN or $R^0$,
q is an integer from 1 to 10, preferably 1, 2, 3, 4, 5, 6 or 7,
$A^{1-4}$ are independently of each other selected from non-aromatic, aromatic or heteroaromatic carbocyclic or heterocyclic groups, which are optionally substituted by one or more groups $R^5$, and wherein each of $-(A^1-Z^1)_m-U^1-(Z^2-A^2)_n-$ and $-(A^3-Z_3)_o-U^2-(Z^4-A^4)_p-$ does not contain more aromatic groups than non-aromatic groups and preferably does not contain more than one aromatic group, $Z^{1-4}$ are independently of each other —O—, —S—, —CO—, —COO—, —OCO—, —O—COO—, —CO—$NR^0$—, —$NR^0$—CO—, —$NR^0$—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, $R^0$ and $R^{00}$ are independently of each other H or alkyl with 1 to 12 C-atoms,
m and n are independently of each other 0, 1, 2, 3 or 4,
and p are independently of each other 0, 1, 2, 3 or 4,
$R^{1-5}$ are independently of each other identical or different groups selected from H, halogen, —CN, —NC, —NCO, —NCS, —OCN, —SCN, —C(=O)$NR^0R^{00}$, —C(=O)$X^0$, —C(=O)$R^0$, —$NH_2$, —$NR^0R^{00}$, —SH, —$SR^0$, —$SO_3H$, —$SO_2R^0$, —OH, —$NO_2$, —$CF_3$, —$SF_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-,
P is a polymerisable group,
Sp is a spacer group or a single bond.

Preferably, the subgroups forming the bridging group B in formula ND are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —$CY^1$=$CY^2$—, —CH=N—, —N=CH—, —N=N— and —CH=$CR^0$— wherein $Y^1$, $Y^2$, $R^0$ have the meanings given above.

Preferably the bridging group, or $—(B)_q—$ in formula ND, comprises one or more groups selected from the group consisting of —C≡C—, optionally substituted 1,4-phenylene and optionally substituted 9H-fluorene-2,7-diyl. The subgroups, or B in formula ND, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or $—(B)_q—$ in formula ND, are selected from —C≡C—, —C≡C—C≡C—, —C≡C—C≡C—C≡C—, —C≡C—C≡C—C≡C—C≡C—,

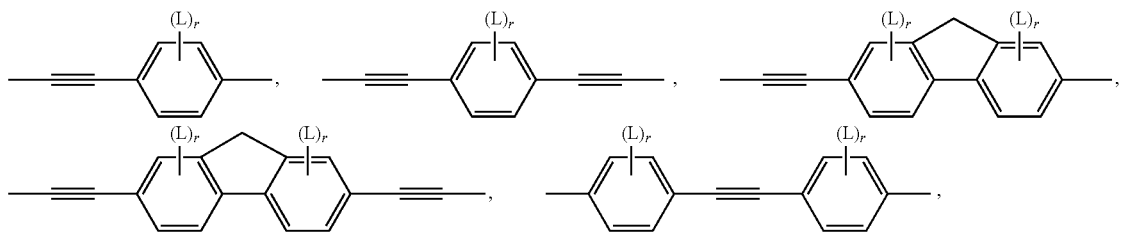

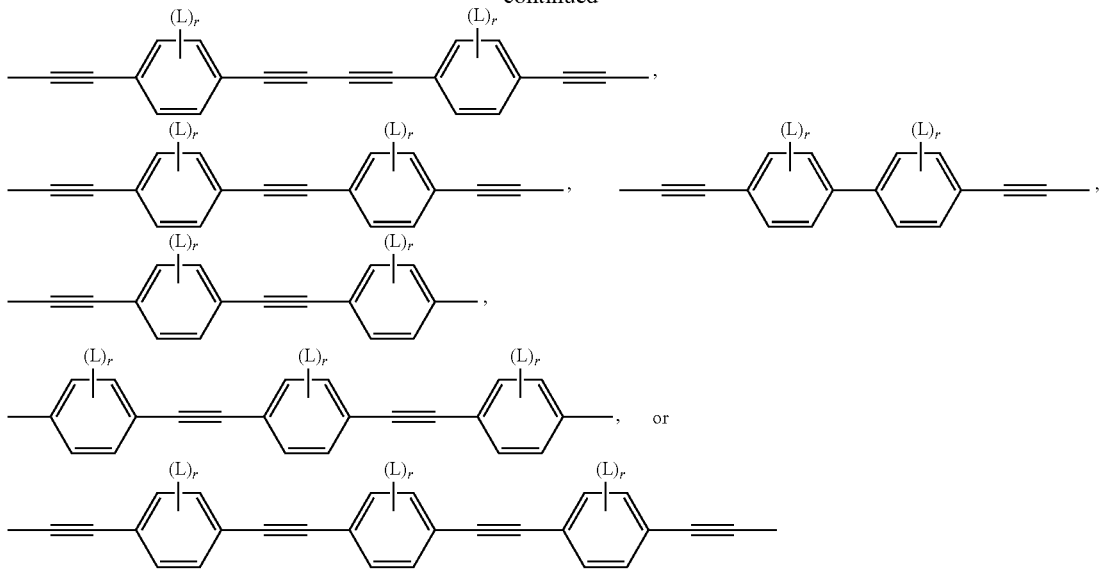

wherein r is 0, 1, 2, 3 or 4 and L has the meaning as described below.

Preferably, the non-aromatic rings of the mesogenic groups where the bridging group is attached, like $U^1$ and $U^2$ in formula ND, are preferably selected from

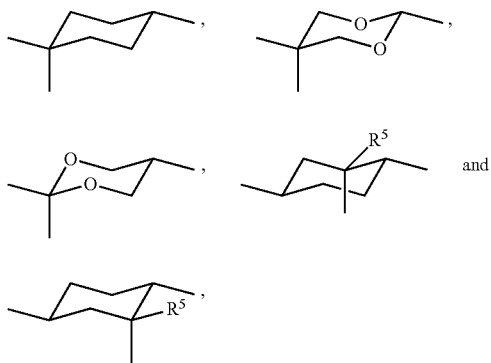

wherein $R^5$ is as defined in formula ND.

Preferably, the aromatic groups $A^{1-4}$ in formula ND, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and that are optionally substituted.

Preferably, the non-aromatic carbocyclic and heterocyclic rings $A^{1-4}$ in the compounds of formula ND, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

Preferably the non-aromatic and aromatic rings, or $A^{1-4}$ in formula ND, are selected from trans-1,4-cyclohexylene and 1,4-phenylene that is optionally substituted with one or more groups L.

Very preferred are compounds of formula ND, wherein m and p are 1 and n and o are 1 or 2. Further preferred are compounds of formula ND, wherein m and p are 1 or 2 and n and o are 0. Further preferred are compounds wherein m, n, o and p are 2.

In the compounds of formula ND, the linkage groups connecting the aromatic and non-aromatic cyclic groups in the mesogenic groups, or $Z^{1-4}$, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH═CH—, —CY$^1$═CY$^2$—, —CH═N—, —N═CH—, —N═N—, —CH═CR$^0$—, —C≡C—, —CH═CH—COO—, —OCO—CH═CH—, CR$^0$R$^{00}$ or a single bond, very preferably from —COO—, —OCO— and a single bond.

Preferably, in the compounds of formula ND, the substituents on the rings, such as L, are preferably selected from P-Sp-, F, Cl, Br, I, —CN, —NO$_2$, —NCO, —NCS, —OCN, —SCN, —O('O)NR$^0$R$^{00}$, —C(═O)X, —C(═O)OR$^0$, —C(═O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula ND and X is halogen.

Preferably, the compounds of formula ND comprise one or more terminal groups, like $R^{1-4}$, or substituents, like $R^5$, that are substituted by two or more polymerizable groups P or P-Sp- (multifunctional polymerizable groups). Suitable multifunctional polymerizable groups of this type are disclosed for example in U.S. Pat. No. 7,060,200 B1 or US 2006/0172090 A1.

Very preferred compounds of formula ND are those of the following sub formulae:
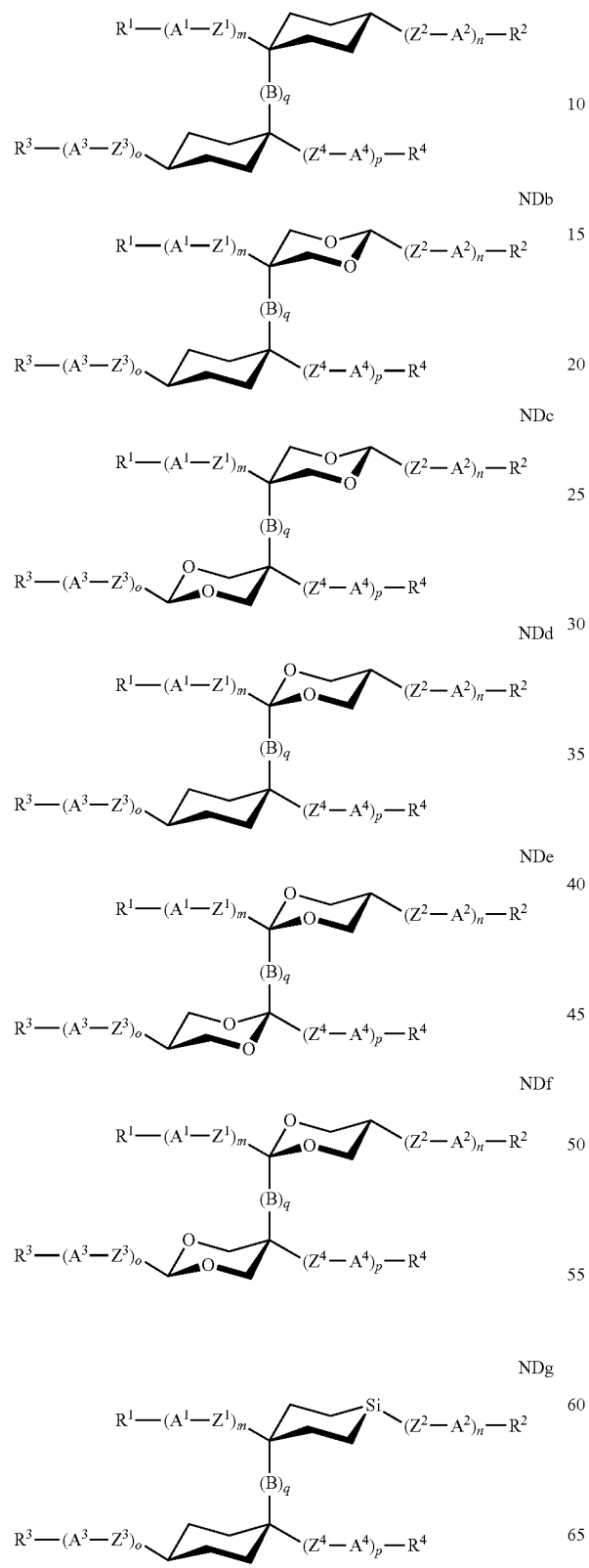
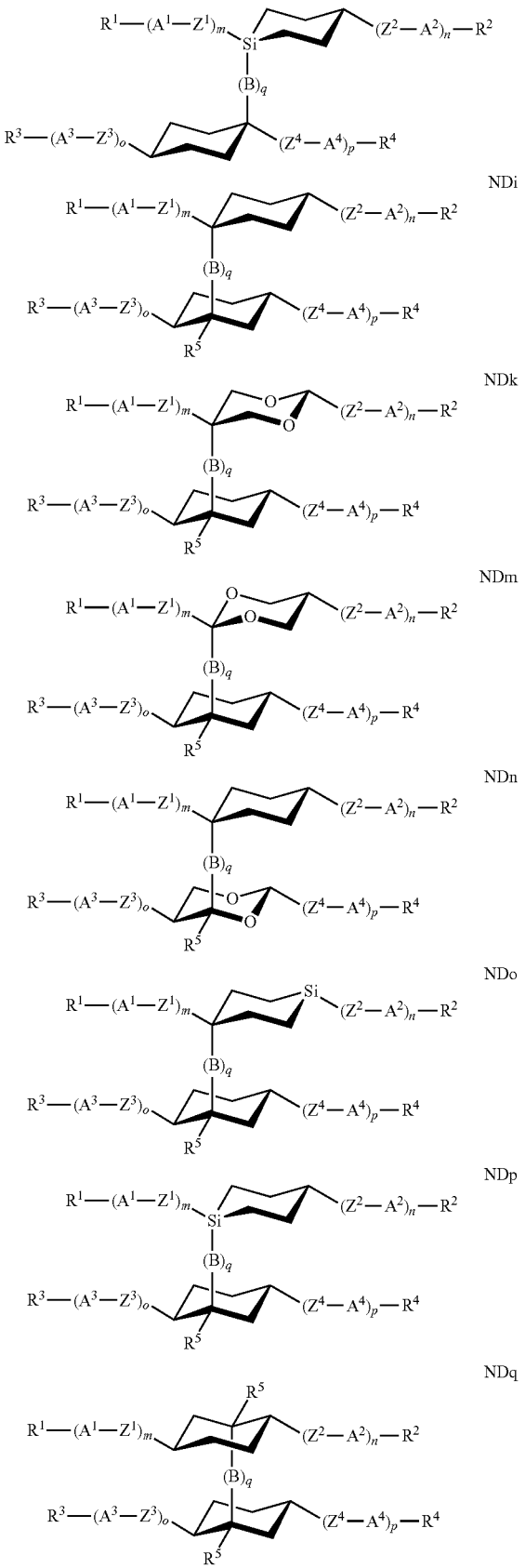

33
-continued
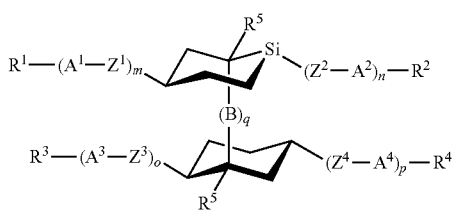
NDr
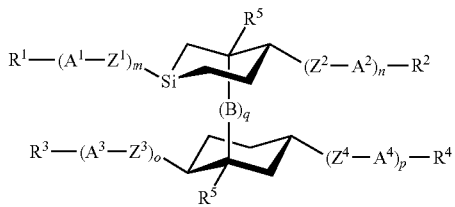
NDs
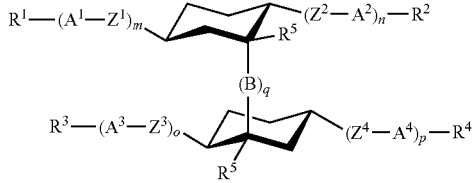
NDt
NDu
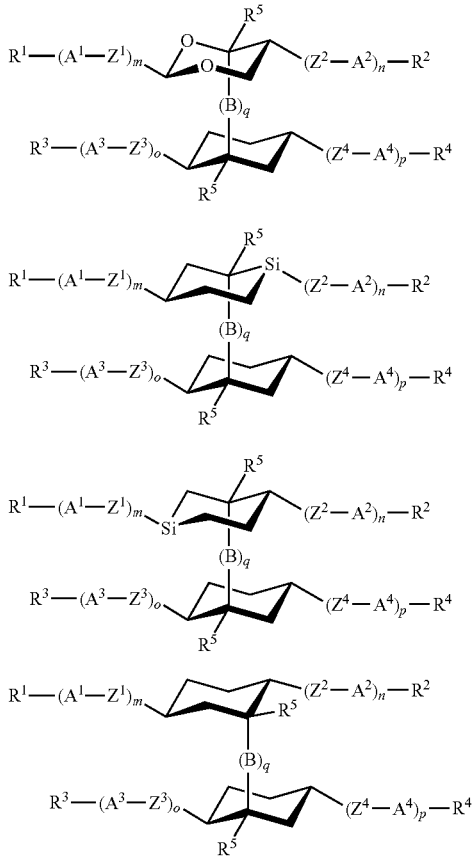
34
-continued
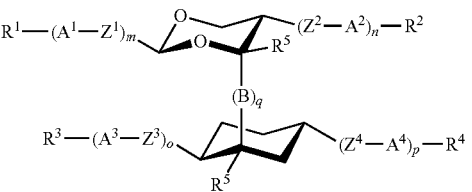
NDv
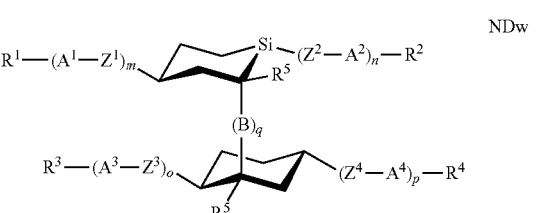
NDw
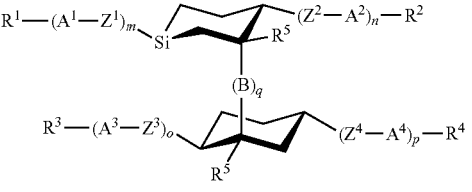
NDx
wherein $R^{1-5}$, $A^{1-4}$, $Z^{1-4}$, B, m, n, o, p and q have one the meanings given above.
Especially preferred are compounds of the following sub formulae:
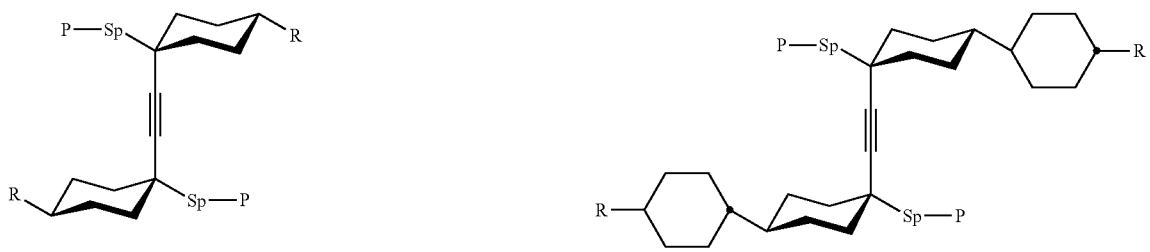
ND1    ND2
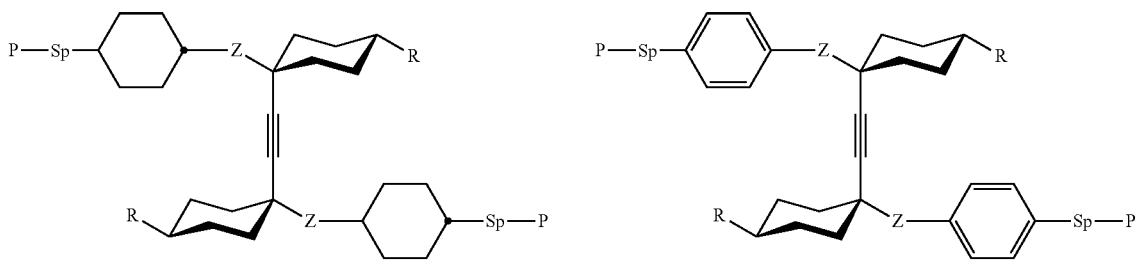
ND3    ND4

-continued
ND5
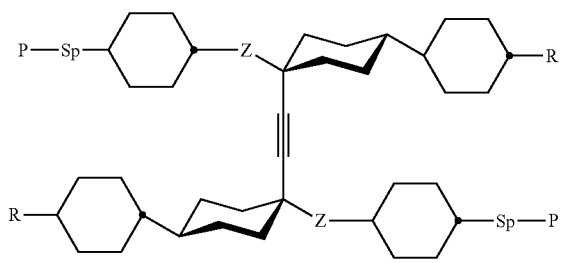
ND6
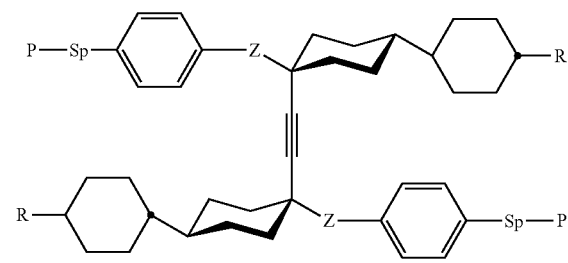
ND7
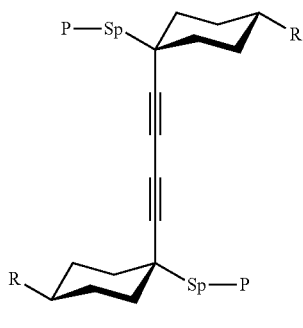
ND8
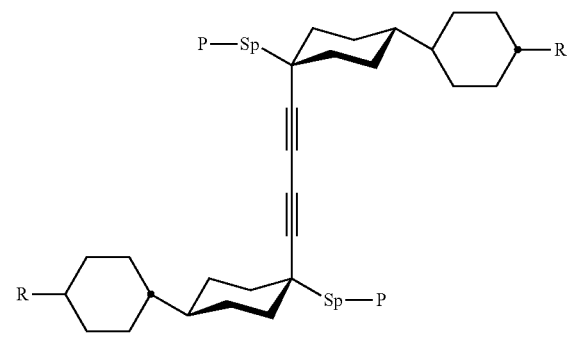
ND9
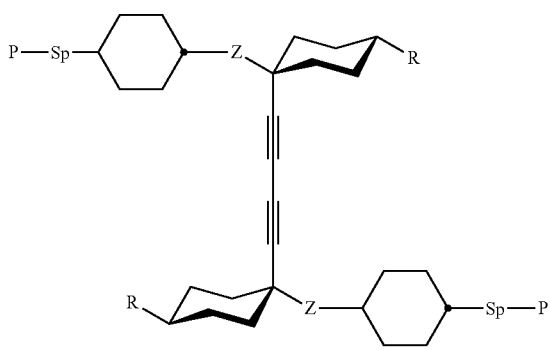
ND10
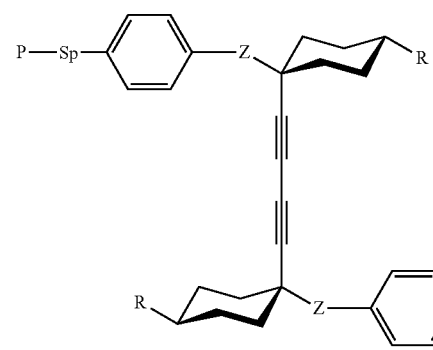
ND11
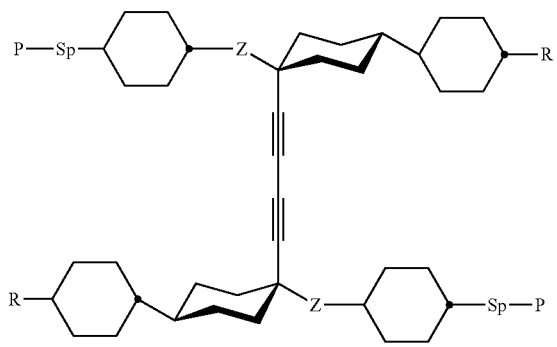
ND12
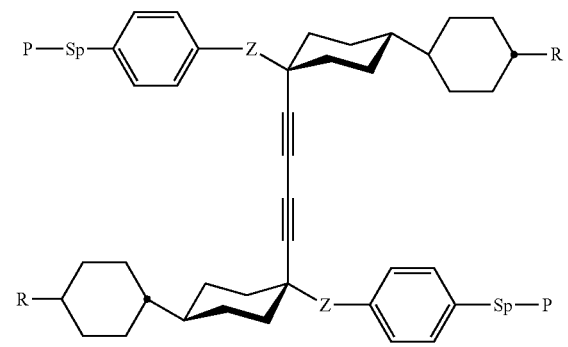

-continued
ND13
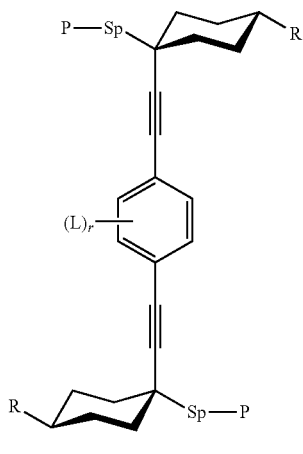
ND14
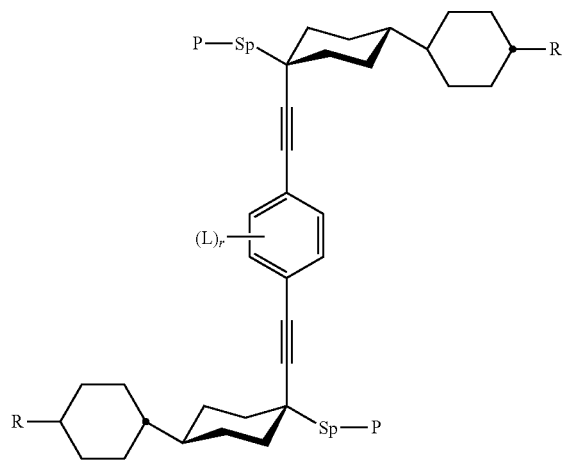
ND15
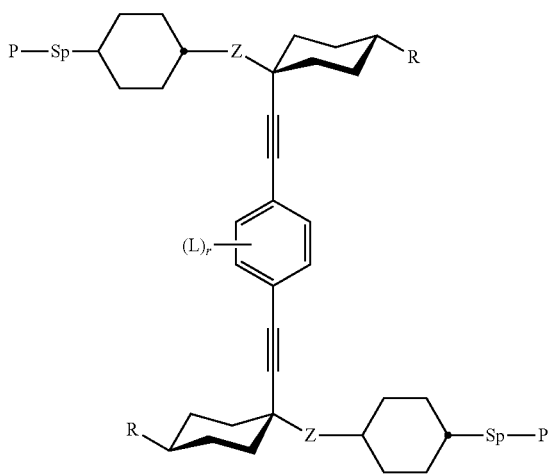
ND16
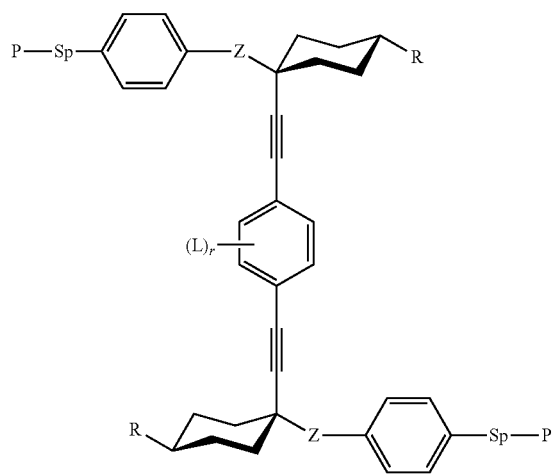
ND17
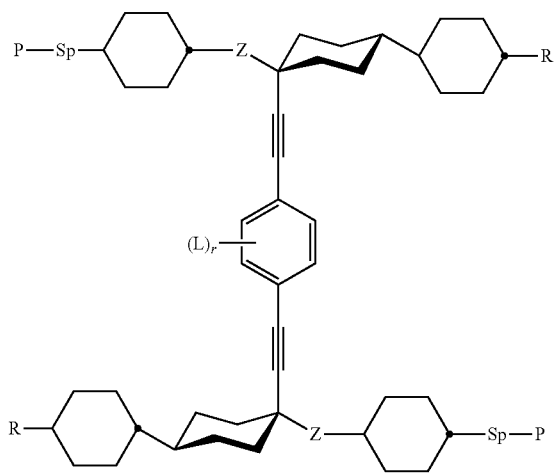
ND18
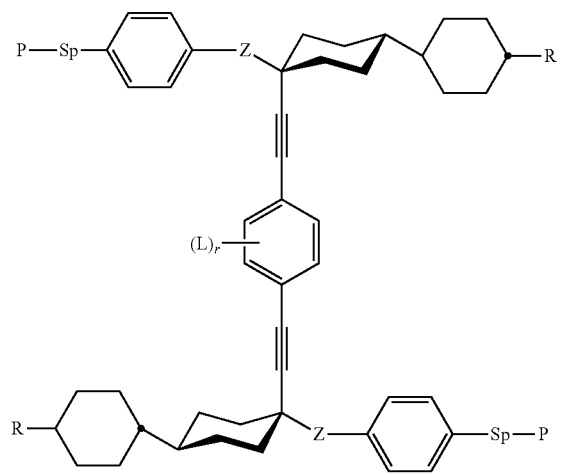

-continued
ND19
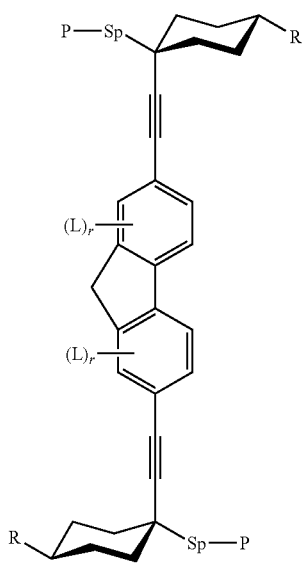
ND20
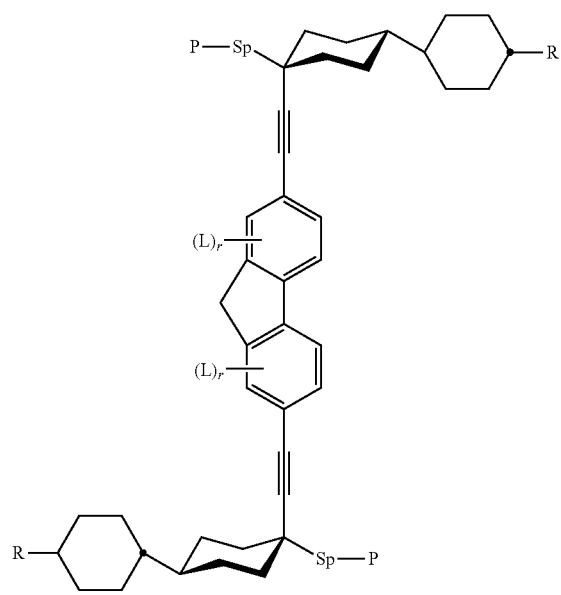
ND21
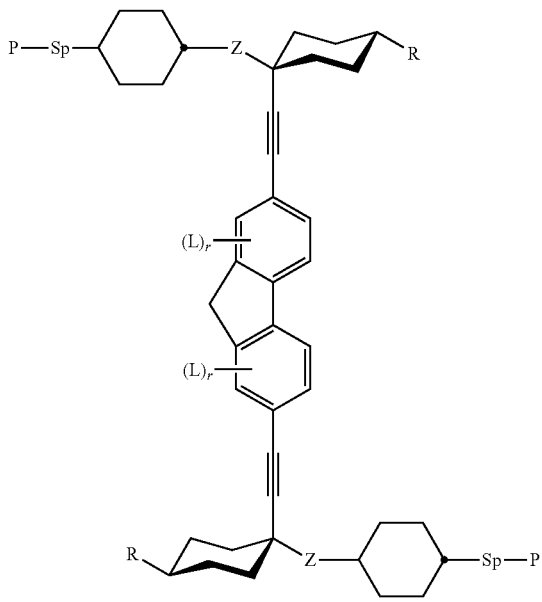
ND22
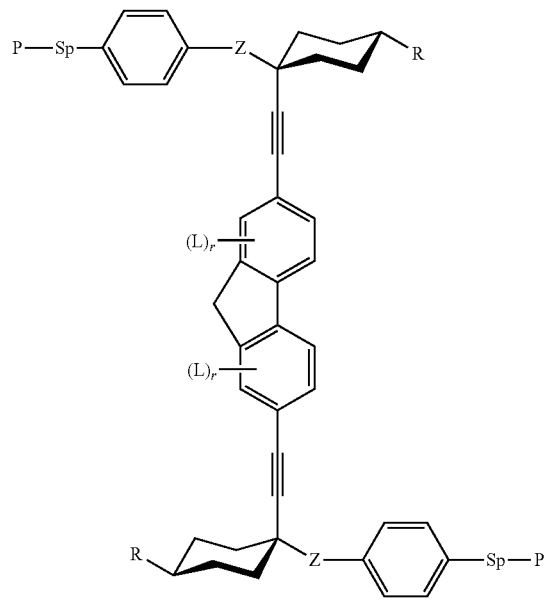

-continued
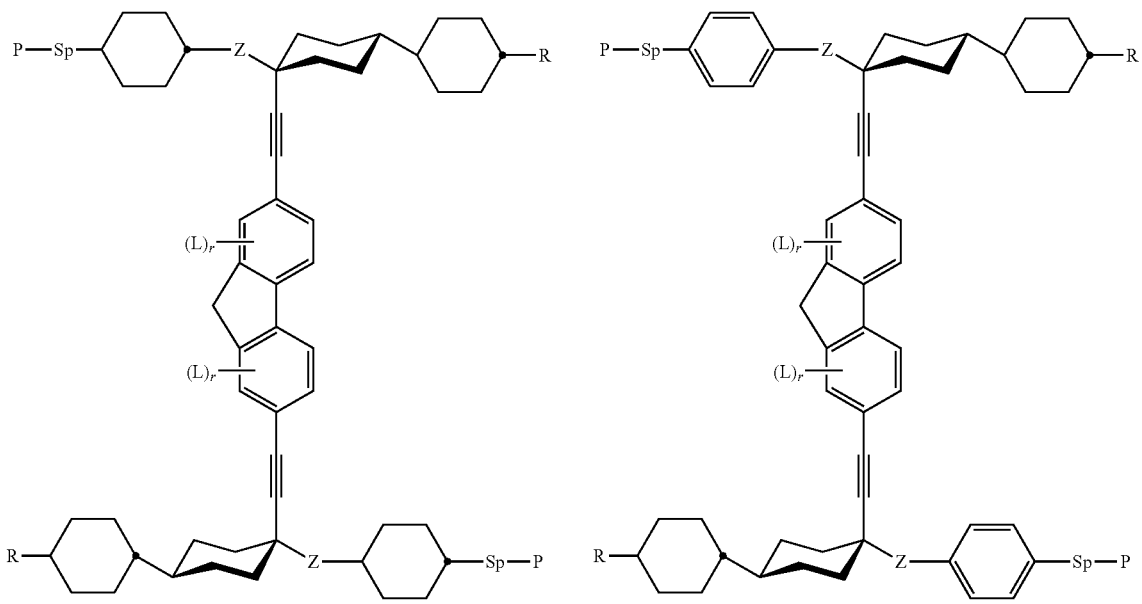
ND23
ND24
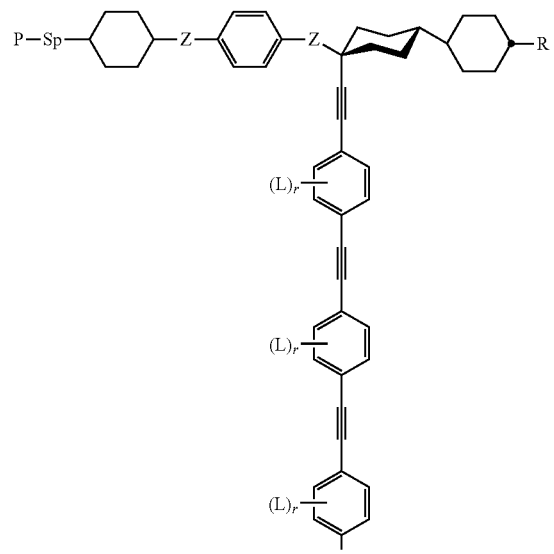
ND25
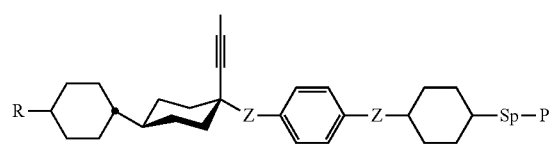

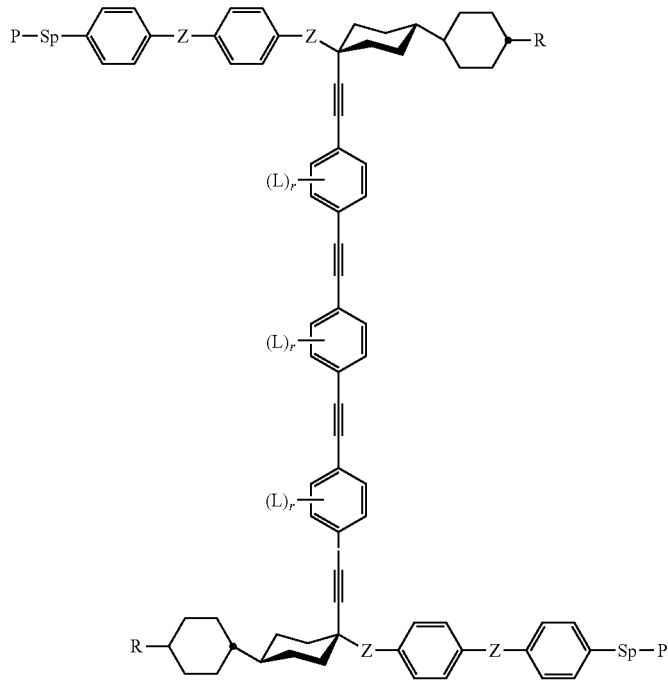

ND26 wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula ND are selected from the group of compounds of formula ND 25 or ND 26, in particular wherein Z denotes —COO—, r is in each occurrence 0, and P, Sp are as defined above.

P-Sp- in these preferred compounds is preferably P-Sp'—X', with X' preferably being —O—, —COO— or —OCOO—.

The compounds of formula ND, its subformulae and suitable methods for their synthesis are disclosed in WO 2008/119427 A1.

The amount of compounds of formula ND in the polymerizable liquid crystal mixture is preferably from 1 to 50%, very preferably from 1 to 40%.

In a further preferred embodiment the polymerizable liquid crystal mixture optionally comprises one or more additives selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerizable liquid crystal mixture optionally comprises one or more additives selected from polymerisable non-mesogenic compounds (reactive thinners). The amount of these additives in the polymerizable liquid crystal mixture is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerizable groups P, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

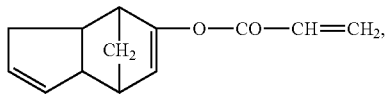

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC materials according to the invention, their proportion optionally corresponds to from about 0 to 5.0% by weight, based on the total weight of the polymerisable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of further light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl) hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethyl hexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methyl phenyl) benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerizable liquid crystal mixture comprises one or more specific antioxidant additives, preferably selected from the Irganox® series, e.g. the commercially available antioxidants Irganox®1076 and Irganox®1010, from Ciba, Switzerland.

In another preferred embodiment, the polymerizable liquid crystal mixture comprises a combination of one or more, more preferably of one or two photoinitiators, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO, further selected from the commercially available OXE02 (Ciba AG), NCI 930, N1919T (Adeka), SPI-03 or SPI-04 (Samyang), or preferably combinations thereof, such as SPI-03 and NCI-930.

The concentration of the polymerisation initiator(s) as a whole in the polymerizable liquid crystal mixture is preferably from 0.5 to 5%, very preferably from 0.5 to 3%, more preferably 1 to 2%.

Preferably, the polymerisable LC mixture comprises besides one or more SAPAs, preferably of formula S,
a) one or more mono-, di- or multireactive polymerisable mesogenic compounds, preferably of formula P,
b) optionally one or more polymerisable mesogenic compounds,
c) optionally one or more antioxidative additives,
d) optionally one or more adhesion promotors,
e) optionally one or more surfactants,
f) optionally one or more mono-, di- or multireactive polymerisable non-mesogenic compounds,
g) optionally one or more dyes showing an absorption maximum at the wavelength used to initiate photo polymerisation,
h) optionally one or more chain transfer agents,
i) optionally one or more stabilizers,
j) optionally one or more lubricants and flow auxiliaries, and
k) optionally one or more diluents,
l) optionally a non-polymerisable nematic component.

More preferably, the polymerizable liquid crystal mixture comprises,
a) one or more compounds of formula S,
b) one or more, preferably two or more, direactive polymerisable mesogenic compounds of formula DRM, preferably in an amount, if present at all, of 10 to 90% by weight, very preferably 15 to 75% by weight, preferably selected from the compounds of formula DRMa-1,
c) optionally one or more, preferably two or more, monoreactive polymerisable mesogenic compounds of formula MRM, preferably in an amount of 10 to 95% by weight, very preferably 25 to 85%, preferably selected from compounds of formulae MRM-1 and/or MRM-7,
d) optionally one or more compounds of formula ND in the preferably in an amount of 1 to 50%, very preferably from 1 to 40%.
e) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
f) optionally one or more lubricants and flow auxiliaries, preferably selected from BYK®388, FC 4430, Fluor N 561 and/or Fluor N 562, and if present, preferably in an amount of 0.1 to 5% by weight, very preferably 0.2 to 3% by weight, and
optionally one or more photoinitiators.

Preferably, the polymerizable LC mixture is dissolved in a suitable solvent before providing it on a suitable substrate. Thus, In another preferred embodiment, the polymerizable liquid crystal mixture comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerizable liquid crystal mixture contains one or more solvents, the total concentration of all solids, including the RMs, in the solvent(s) is preferably from 10 to 60%.

This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerizable liquid crystal mixture can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

In a preferred embodiment the linearly polarised light is ultraviolet light which enables simultaneous photoalignment of the self assembling photoalignment agent and photocuring of the polymerizable liquid crystal molecules compound.

A self assembling photoalignment agent (SAPA) according to the present invention is preferably a compound comprising at least one polar lateral group and at least one photoreactive group. Considering the investigations for this invention it appears that the polar lateral group interacts with the substrate surface thus enabling the SAPA to phase separate from the LC mixture after filling of the LC cell. According to this opinion, the SAPA forms a layer on the substrate which can be photoaligned with linearly polarised UV light. The liquid crystal follows the orientation of the aligned SAPA to give uniform planar alignment across the whole display.

The photoalignment process according to the present invention causes the SAPA to undergo an isomerisation under irradiation with linearly polarised light of appropriate wavelength. The photoisomerisation is an angle-dependent process, resulting eventually in the photoselection of SAPA orientations that are preferentially perpendicular to the polarization of the actinic light and with orientational anisotropy capable of aligning LCs.

The wavelength region of the polarised light is preferably chosen so as to match the absorption spectrum of the SAPA.

In case the alignment is reversible, for example under the influence of heat or light, it is mandatory to fix the alignment of the SAPA and the LC.

For the production of the polymer films according to the present invention, the polymerisable LC mixture is preferably allowed to redistribute on the surface of the substrate. After providing a layer of the polymersisable LC Mixture on the substrate, the layer is annealed for a time between 10 seconds and 1 h, preferably between 20 seconds min and 30 minutes and most preferably between 30 seconds and 5 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 80° C.

In a preferred embodiment, one or more of the process steps of annealing, photoalignment and curing of the polymerizable compound is performed at a temperature above the clearing point of the polymerizable liquid crystal mixture.

During the photoalignment of the polymerizable liquid crystal compounds, anisotropy is induced by exposing the display or the liquid crystal layer to linearly polarised light.

In a preferred embodiment of the present invention the SAPA is photoaligned in a first step using linearly polarised light and in a second step the polymerizable liquid crystal compounds are cured using linearly polarized or unpolarised UV light.

In another preferred embodiment, the linearly polarised light applied according to the inventive process is ultraviolet light or VIS which enables photoalignment.

Photoalignment of the SAPA and curing of the polymerizable liquid crystal compounds can be performed simultaneously or stepwise. In case the process is split into different steps, the individual steps can be performed at the same temperature or at different temperatures.

The curing time is dependent, inter alia, on the reactivity of the polymerisable LC mixture, the thickness of the coated layer, the type of polymerisation initiator and the power of the UV lamp. The curing time is preferably 5 minutes, very preferably 3 minutes, most preferably 1 minute. For mass production, short curing times of 30 seconds are preferred.

A suitable UV radiation power is preferably in the range from 5 to 200 mWcm-2, more preferably in the range from 50 to 175 mWcm−2 and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Photopolymerisation is preferably performed under an inert gas atmosphere, preferably in a heated nitrogen atmosphere, but also polymerisation in air is possible.

After the photoalignment and curing step(s) a so-called "post-curing" step can optionally be performed by irradiation with UV-light and/or visible light (both either linearly or unpolarised) at reduced temperature in order to remove unreacted polymerizable compounds. The post-curing is preferably performed at above 0° C. and below the clearing point of the utilized LC mixture, preferably 20° C. and below 60° C.° C., and most preferably above 20° C. and below 40° C.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 μm, in particular not greater than 0.5 μm, very preferably not greater than 0.2 μm.

For example, uniformly planar aligned polymer films of the present invention can be used as retardation or compensation films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 μm, very preferably from 0.5 to 5 μm, in particular from 0.5 to 3 μm.

The optical retardation ($\delta(\lambda)$) of a polymer film as a function of the wavelength of the incident beam ($\lambda$) is given by the following equation:

$$\delta(\lambda) = (2\pi \Delta n \cdot d)\lambda$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n = \sin\Theta / \sin\Psi$$

wherein sin Θ is the incidence angle or the tilt angle of the optical axis in the film and sin Ψ, is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film according to the present invention is less than 200 nm, preferable less than 180 nm and even more preferable less than 150 nm.

Especially with regard to the in cell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerizable liquid crystal mixture coated thereon. In this way, stacks of polymerised LC films can be prepared.

In summary, the polymerised LC films according to the present invention are useful in optical components like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymer films or optical components according to the present invention can be used in optical devices such as displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20th International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it.

EXAMPLES

Utilized RMs

For the following mixtures, the following RMs are utilized:

| RM | No. |
|---|---|
| $CH_2=CHCOO(CH_2)_6O$—⟨phenyl⟩—COO—⟨phenyl⟩—CN | 1 |

-continued

| RM | No. |
|---|---|
| 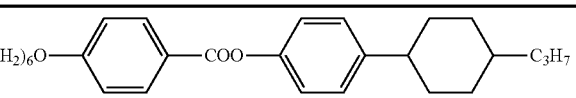 CH₂=CHCOO(CH₂)₆O—⌬—COO—⌬—⌬—C₃H₇ | 2 |
| 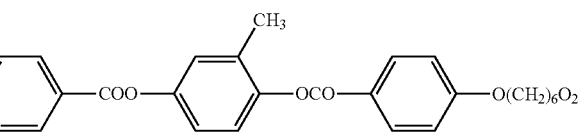 CH₂=CHCO₂(CH₂)₆O—⌬—COO—⌬(CH₃)—OCO—⌬—O(CH₂)₆O₂CCH=CH₂ | 3 |
| 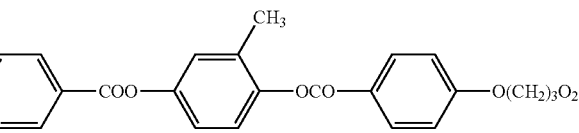 CH₂=CHCO₂(CH₂)₃O—⌬—COO—⌬(CH₃)—OCO—⌬—O(CH₂)₃O₂CCH=CH₂ | 4 |

Utilized SAPA:

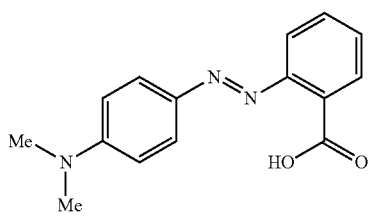

Methyl Red

SAPA-1

Utilized Mixtures

The following mixtures CM-1 and M-1 to 4 are prepared in accordance with the following table:

| Mixture | CM-1 % [w/w] | M-1 % [w/w] | M2 % [w/w] | M3 % [w/w] | M4 % [w/w] |
|---|---|---|---|---|---|
| Irganox 1076 | 0.08% | 0.08% | 0.08% | 0.08% | 0.08% |
| FluorN 562 | 0.61% | 0.61% | 0.61% | 0.61% | 0.61% |
| RM-1 | 25.28% | 25.03% | 23.50% | 22.00% | 20.00% |
| RM-2 | 25.28% | 25.03% | 23.50% | 22.00% | 20.00% |
| RM-3 | 9.78% | 9.69% | 9.25% | 9.00% | 6.00% |
| RM-4 | 38.97% | 38.56% | 38.06% | 36.31% | 33.31% |
| SAPA-1 | 0.00% | 1.00% | 5.00% | 10.00% | 20.00% |

Irganox1076® is a stabilizer being commercially available (Ciba AG, Basel, Switzerland). FluorN 562 FluorN is a non-reactive, high fluorine content, ethylene glycol based polymeric fluorosurfactant commercially available (Cytonix LLC, Beltsville, USA)

General Method for the Polymer Film Preparation:

The mixture of interest is spin coated at 3000 rpm for 30 s onto a raw glass slide with no alignment layer.

The sample is annealed at 60° C. for 60 s on a temperature controlled hot plate.

The sample is heated to the isotropic phase of the corresponding mixture, e.g. 100° C. for 60 seconds, and then irradiated with linear polarized light (250-450 nm Omnicure High Pressure Hg Lamp, 30 mW/cm² for 60 s) while being in the isotropic phase.

Experiment 1

Polymer films are produced using the above described method.

The polymer film obtained from mixture CM-1 (CE-1) is compared with polymer films obtained from mixtures M-1 to M-4 containing different amounts of SAPA (E-1 to E-4).

Each film is visually inspected for uniform homogeneous alignment between crossed polarizers.

| Example | CE-1 | E-1 | E-2 | E-3 | E-4 |
|---|---|---|---|---|---|
| Alignment Quality | No alignment | good | good | good | good |

Retardation for polymer films resulting from mixtures M-1 to M-4 is measured at angles of incidence from −60° to 40° at a temperature of 20° C. at a wavelength of 550 nm.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

| Angle (°) | −60 | −40 | −20 | 0 | 20 | 40 |
|---|---|---|---|---|---|---|
| R(550) of M-1 | 119.82 | 131.92 | 142.56 | 145.78 | 141.91 | 131.80 |
| R(550) of M-2 | 113.83 | 125.32 | 135.43 | 138.49 | 134.81 | 125.21 |
| R(550) of M-3 | 110.23 | 121.37 | 131.16 | 134.12 | 130.56 | 121.26 |
| R(550) of M-4 | 93.46 | 102.90 | 111.20 | 113.71 | 110.69 | 102.80 |

The invention claimed is:

1. A method for manufacturing a homogeneous aligned polymer film comprising at least the steps of:
   providing a polymerizable liquid crystal mixture, comprising one or more polymerizable liquid crystal molecules, wherein the total concentration of the one or more polymerizable liquid crystal molecules in the liquid crystal mixture is 85 to 99.9%, and one or more self assembling photoalignment agents, on a substrate;
   irradiating the liquid crystal mixture with linearly polarised light causing photoalignment of the polymerizable liquid crystal mixture;
   optionally curing the polymerizable liquid crystal compounds by irradiation with ultraviolet light,
   wherein said homogeneous aligned polymer film is manufactured.

2. The method according to claim 1, wherein the one or more self assembling photoalignment agents are compounds of formula S,

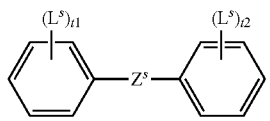

S wherein
   $L^s$ each, identically or differently, denote F, Cl, CN, SCN, $SF_5$ or a straight-chain, in each case optionally fluorinated, alkyl, alkoxy, alkylcarbonyl, alkoxycarbonyl, alkylcarbonyloxy or alkoxycarbonyloxy having 1 to 12 C atoms, or a branched, in each case optionally fluorinated, alkyl, alkoxy, alkylcarbonyl, alkoxycarbonyl, alkylcarbonyloxy or alkoxycarbonyloxy having 3 to 12 C atoms, $(Sp^s)_{r1}$-G, Y, or $(Sp^s)_{r1}$-PS
   $P^s$ each, independently of one another, denote a polymerisable group,
   $Sp^s$ on each occurrence, identically or differently, denote a spacer group,
   Y denotes $(R^b)_2$N- or, RC(O)O—,
   G denotes —OH or $Si(OR^a)_3$,
   $R^a$, $R^b$, $R^c$ each denote, identically or differently, H, a straight chain alkyl with 1 to 6 C atoms, or a branched alkyl with 3 to 6 C atoms,
   r1 denotes 0 or 1,
   t1, t2 denotes, each independently, 1, 2, 3, 4 or 5, and
   $Z^s$ denotes —N=N—, —CH=CH—, —CH=CH—COO—, —OCO—CH=CH—, —CO—CH=CH—, or —CH=CH—CO—, wherein one or more H are optionally replaced by halogen.

3. The method according to claim 1, wherein the one or more self assemble photoalignment agents are compounds of formula S1,

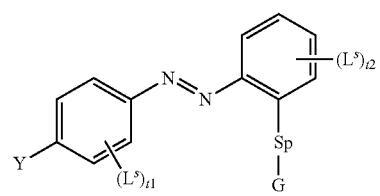

S1 wherein
   Y denotes $(R^b)_2$N—, $R^c$C(O)O—, or a group Ls,
   Sp denotes a spacer group,
   G denotes —OH or $Si(OR^a)_3$,
   $R^a$, $R^b$, $R^c$ each denote, identically or differently, a straight chain or branched alkyl with 1 to 6 C atoms, or branched alkyl with 3 to 6 C atoms, LS each, identically or differently, denote P-Sp-, F, Cl, Br, I, —CN, —$NO_2$, —NCO, —NCS, —OCN, —SCN, —C(=O)$NR^{00}R^{000}$, —C(=O)$OR^{00}$, —C(=O)$R^{00}$, —$NR^{00}R^{000}$, —OH, —$SF_5$, optionally substituted silyl, or aryl or heteroaryl with 3 to 12 C atoms, or a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl,
   $R^{00}$ and $R^{000}$ each, independently of one another, denote H, F or a straight-chain or branched alkyl having 1 to 12 C atoms, or a branched alkyl having 3 to 12 C atoms, wherein one or more H atoms are optionally replaced by F,
   t1, t2 denotes 0, 1, 2, 3 or 4.

4. The method according to claim 1, wherein the total concentration of the one or more self assembling photoalignment agents in the liquid crystal mixture is 1 to 15%.

5. The method according to claim 1, wherein the one or more polymerizable liquid crystal molecules are compounds of formula DRM, $$P^1\text{-}Sp^1\text{-}MG\text{-}Sp^2\text{-}P^2 \qquad \text{DRM}$$

wherein
   $P^1$ and $P^2$ independently of each other denote a polymerizable group,
   $Sp^1$ and $Sp^2$ independently of each other are a spacer group or a single bond, and
   MG is a rod-shaped mesogenic group.

6. The method according to claim 1, wherein the one or more polymerizable liquid crystal molecules are selected from compounds of the following formulae,

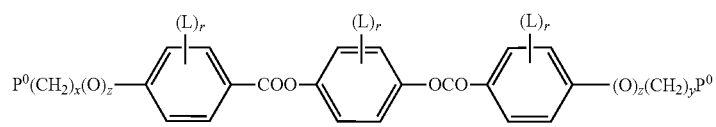

DRMa1

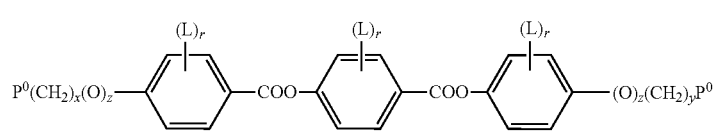

DRMa2

-continued

DRMa3
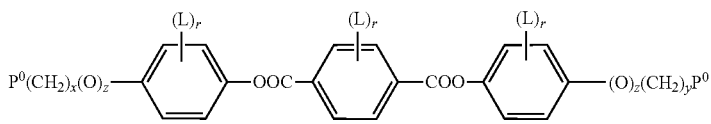

DRMa4
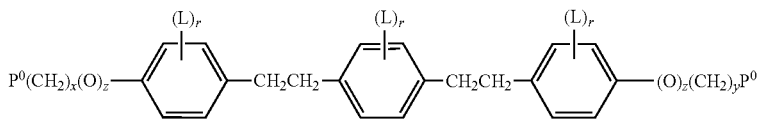

DRMa5
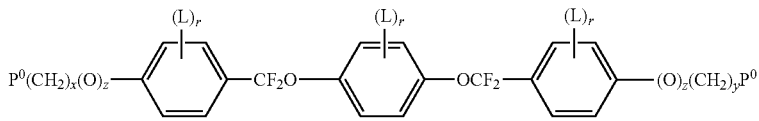

DRMa6
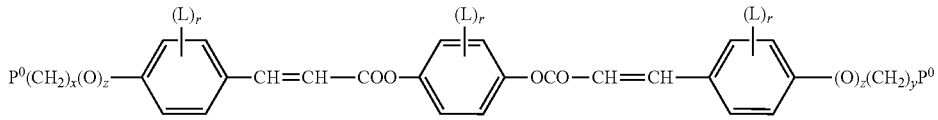

DRMa7
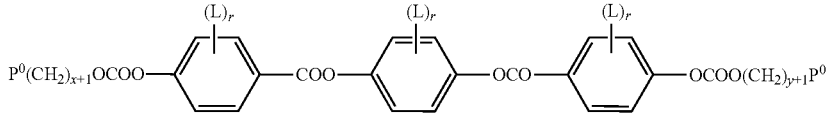

DRMb
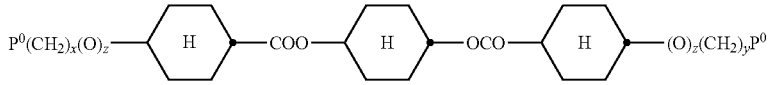

DRMc
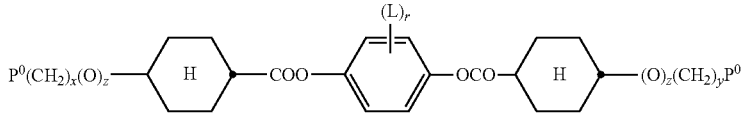

DRMd
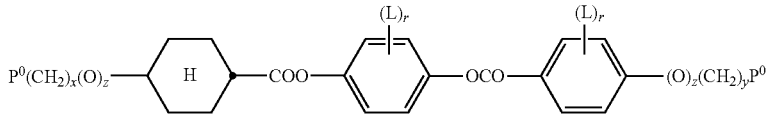

DRMe
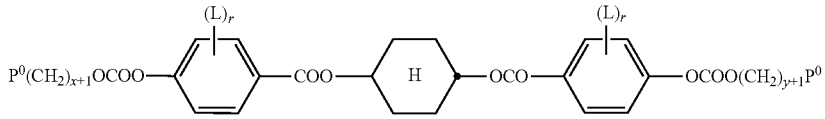

wherein
- $P^0$ is, in case of multiple occurrence independently of one another, an acryl, methacryl, oxetane, epoxy, vinyl, heptadiene, vinyloxy, propenyl ether or styrene group,
- L is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, or aryl or heteroaryl with 3 to 12 C atoms, a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl,
- $R^{00}$ and $R^{000}$ each, independently of one another, denote H, F or a straight-chain alkyl having 1 to 12 C atoms, or branched alkyl having 3 to 12 C atoms, wherein one or more H atoms are optionally replaced by F,
- r is 0, 1, 2, 3 or 4,
- x and y are independently of each other 0 or identical or different integers from 1 to 12,
- Z is, each independently, 0 or 1, with z being 0 if the adjacent x or y is 0.

7. The method according to claim 1, wherein the one or more polymerizable liquid crystal molecules are of formula MRM, $$P^1\text{-}Sp^1\text{-}MG\text{-}R \qquad \text{MRM}$$

wherein
- $P^1$ denotes a polymerizable group,
- $Sp^1$ is a spacer group or a single bond,
- MG is a rod-shaped mesogenic group,
- R is F, Cl, Br, I, —CN, —NO$_2$, —NCO, —NCS, —OCN, —SCN, —C(=O)NRXRY, —C(=O)X, —C(=O)ORX, —C(=O)RY, —NR*RY, —OH, —SF$_5$, optionally substituted silyl, or a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl, X is halogen, and $R^x$ and $R^y$ are independently of each other H or alkyl with 1 to 12 C-atoms.

8. The method according to claim 1, wherein the one or more polymerizable liquid crystal molecules are selected from the following formulae,

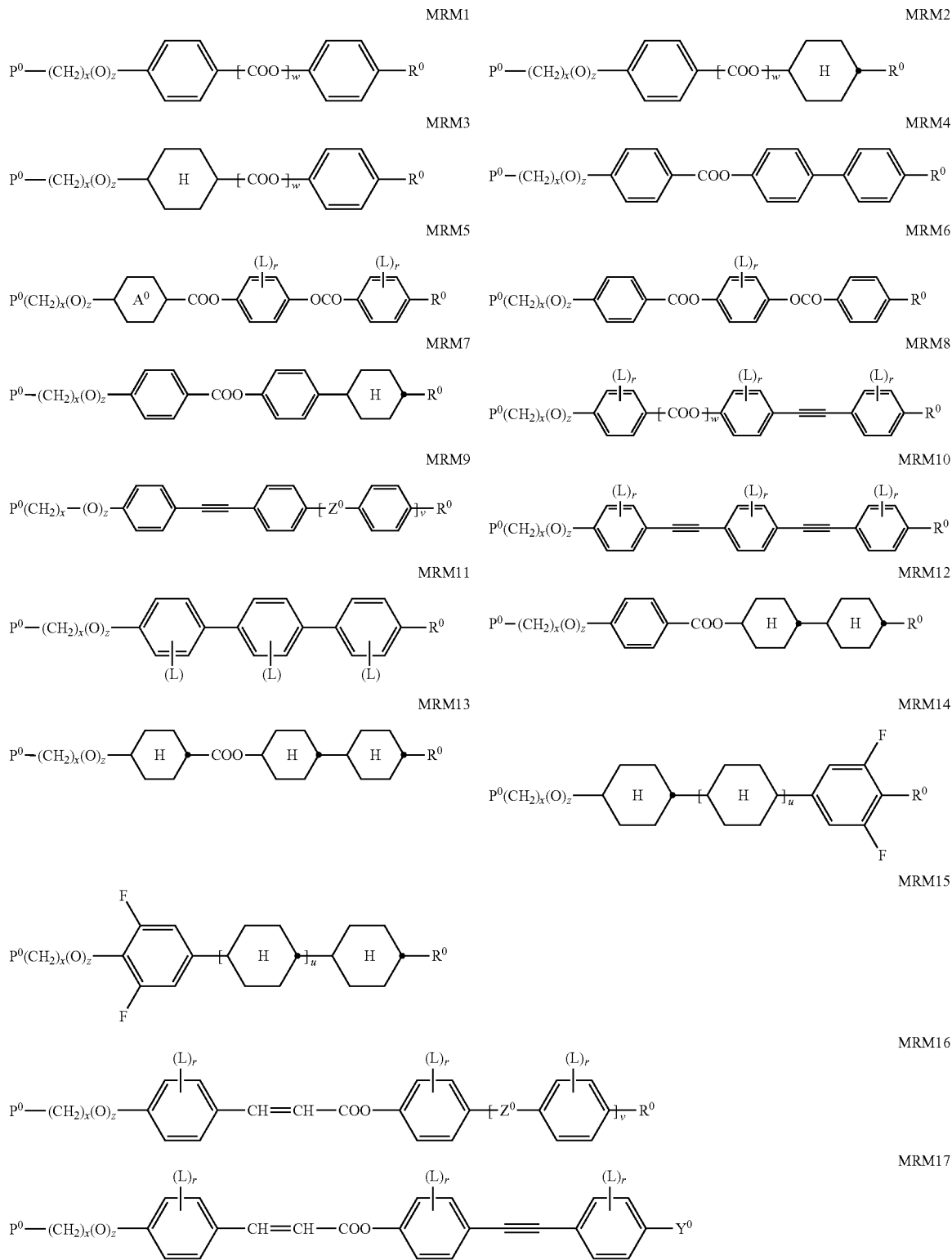

-continued

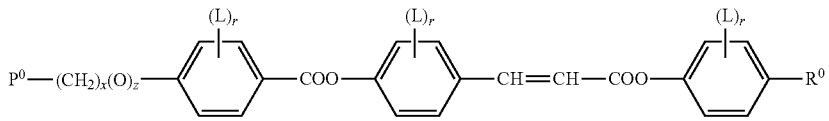
MRM18

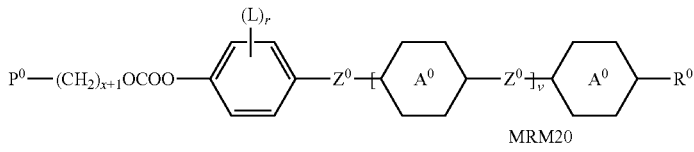
MRM19

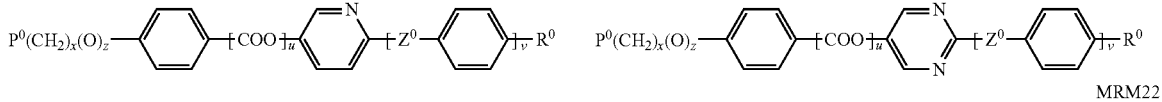
MRM20     MRM21

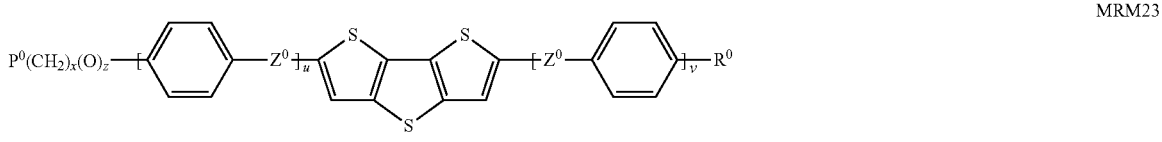
MRM22
MRM23

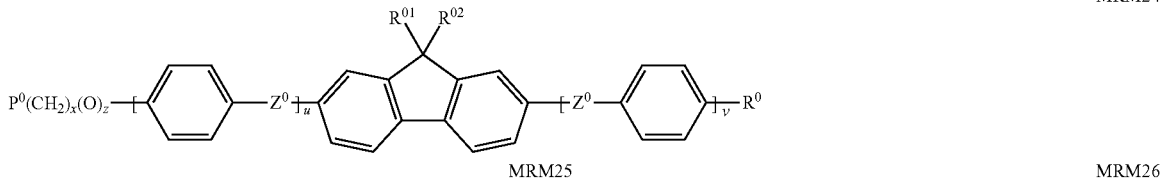
MRM24
MRM25    MRM26

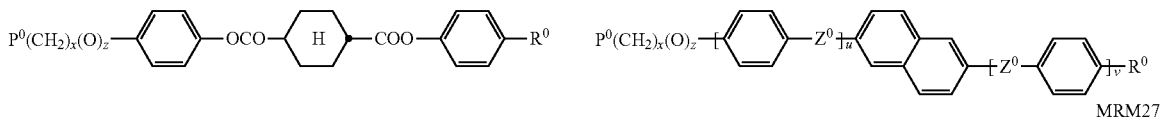
MRM27 wherein P⁰ is, in case of multiple occurrence independently of one another, an acryl, methacryl, oxetane, epoxy, vinyl, heptadiene, vinyloxy, propenyl ether or styrene group, L is P-Sp-, F, Cl, Br, I, —CN, —NO$_2$, —NCO, —NCS, —OCN, —SCN, —C(=O)NR$^{00}$R$^{2000}$, —C(=O) OR$^{00}$, —C(=O)R$^{00}$, —NR$^{200000}$, —OH, —SF$_5$, optionally substituted silyl, or aryl or heteroaryl with 3 to 12 C atoms, or a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl, R$^{00}$ and R$^{000}$ each, independently of one another, denote H, F or a straight-chain or branched alkyl having 1 to 12 C atoms, or a branched alkyl having 3 to 12 C atoms, wherein one or more H atoms are optionally replaced by F, r is 0, 1, 2, 3 or 4, x and y are independently of each other 0 or identical or different integers from 1 to 12, Z is, each independently, 0 or 1, with z being 0 if the adjacent x or y is 0, R⁰ is an alkyl, alkoxy, thioalkyl, alkylcarbonyl, alkoxycarbonyl, alkylcarbonyloxy or alkoxycarbonyloxy with 1 or more C atoms or denotes Y⁰, Y⁰ is F, Cl, CN, NO$_2$, OCH$_3$, OCN, SCN, SF$_5$, or a mono- oligo- or polyfluorinated alkyl or alkoxy with 1 to 4 C atoms, Z⁰ is —COO—, —OCO—, —CH$_2$CH$_2$—, —CF$_2$O—, —OCF$_2$—, —CH=CH—, —OCO—CH=CH—, —CH=CH—COO—, or a single bond, A⁰ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, W is 0 or 1, and wherein the benzene and naphthalene rings are optionally substituted with one or more identical or different groups L.

9. The method according to claim 1, wherein the total concentration of the one or more polymerizable liquid crystal molecules in the liquid crystal mixture is 90 to 99.9%.

10. The method according to claim 1, wherein the polarised light is ultraviolet light.

11. The method according to claim 1, wherein the polarised light is VIS light.

12. A polymer film obtainable by the method according to claim 1.

13. An optical component comprising a polymer film according to claim 12.

14. An optical device comprising a polymer film according to claim 12.

15. The method according to claim 1, wherein the one or more polymerizable liquid crystal molecules are compounds of formula DRM, $$P^1\text{-}Sp^1\text{-}MG\text{-}Sp^2\text{-}P^2 \qquad \text{DRM}$$

wherein
- $P^1$ and $P^2$ independently of each other denote a polymerizable group,
- $Sp^1$ and $Sp^2$ independently of each other are a spacer group or a single bond, and
- MG is a rod-shaped mesogenic group of formula MG $$\text{-}(A^{11}\text{-}Z^{11})_n\text{-}A^{12}\text{-} \qquad \text{MG}$$

- $A^{11}$ and $A^{12}$ denote, in case of multiple occurrence independently of one another, an aromatic or alicyclic group, which optionally contains one or more heteroatoms selected from the group consisting of N, O and S, and is optionally mono- or polysubstituted by $L^{11}$,
- $L^{11}$ is P-Sp-, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{001000}$, —OH, —SF$_5$, optionally substituted silyl, or aryl or heteroaryl with 3 to 12 C atoms, a straight chain alkyl, alkoxy, alkylcarbonyl, alkoxycarbonyl, alkylcarbonyloxy or alkoxycarbonyloxy with 1 to to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl,
- $R^{00}$ and $R^{000}$ each, independently of one another, denote H, For a straight-chain or branched alkyl having 1 to 12 C atoms, or a branched alkyl having 3 to 12 C atoms, wherein one or more H atoms are optionally replaced by F,
- $Z^{11}$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond,
- $Y^1$ and $Y^2$ independently of each other denote H, F, Cl or CN,
- n is 1, 2, 3 or 4, and
- n1 is an integer from 1 to 10.

16. The method according to claim 1, wherein the one or more polymerizable liquid crystal molecules are of formula MRM, $$P^1\text{-}Sp^1\text{-}MG\text{-}R \qquad \text{MRM}$$

wherein
- $P^1$ denotes a polymerizable group,
- $Sp^1$ is a spacer group or a single bond,
- MG is a rod-shaped mesogenic group of formula MG $$\text{-}(A^{11}\text{-}Z^{11})_n\text{-}A^{12}\text{-} \qquad \text{MG}$$

- $A^{11}$ and $A^{12}$ denote, in case of multiple occurrence independently of one another, an aromatic or alicyclic group, which optionally contains one or more heteroatoms selected from the group consisting of N, O and S, and is optionally mono- or polysubstituted by $L^{11}$,
- $L^{11}$ is P-Sp-, F, Cl, Br, I, —CN, —NO$_2$, —NCO, —NCS, —OCN, —SCN, —C(=O)NR$^{001000}$, —C(=O)OR$^{00}$, —C(=O)R$^{00}$, —NR$^{001000}$, —OH, —SF$_5$, optionally substituted silyl, or aryl or heteroaryl with 3 to 12 C atoms, a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl,
- $R^{00}$ and $R^{000}$ each, independently of one another, denote H, For a straight-chain or branched alkyl having 1 to 12 C atoms, or a branched alkyl having 3 to 12 C atoms, wherein one or more H atoms are optionally replaced by F,
- $Z^{11}$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond,
- $Y^1$ and $Y^2$ independently of each other denote H, F, Cl or CN,
- n is 1, 2, 3 or 4,
- n1 is an integer from 1 to 10,
- R is F, Cl, Br, I, —CN, —NO$_2$, —NCO, —NCS, —OCN, —SCN, —C(=O)NR*RY, —C(=O)X, —C(=O)ORX, —C(=O)RY, —NR*RY, —OH, —SF$_5$, optionally substituted silyl, or a straight chain alkyl, alkoxy, alkylcarbonyl, alkoxycarbonyl, alkylcarbonyloxy or alkoxycarbonyloxy with 1 to 12 C atoms, or a branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl,
- X is halogen, and
- $R^x$ and $R^y$ are independently of each other H or alkyl with 1 to 12 C-atoms.

* * * * *